(12) United States Patent
Nakashima et al.

(10) Patent No.: US 10,759,943 B2
(45) Date of Patent: Sep. 1, 2020

(54) BLACK MIXED OXIDE MATERIAL AND METHOD FOR MANUFACTURING SAME

(71) Applicants: Nakashima Sangyo Co., Ltd., Seto-shi, Aichi (JP); Okuno Chemical Industries Co., Ltd., Osaka-shi, Osaka (JP)

(72) Inventors: Mikio Nakashima, Aichi (JP); Takashi Kato, Osaka (JP)

(73) Assignees: Nakashima Sangyo Co., Ltd., Seto-shi (JP); Okuno Chemical Industries Co., Ltd., Osaka-shi (JP)

( * ) Notice: Subject to any disclaimer, the term of this patent is extended or adjusted under 35 U.S.C. 154(b) by 0 days.

(21) Appl. No.: 16/622,115

(22) PCT Filed: Jun. 7, 2018

(86) PCT No.: PCT/JP2018/021875
§ 371 (c)(1),
(2) Date: Dec. 12, 2019

(87) PCT Pub. No.: WO2018/230438
PCT Pub. Date: Dec. 20, 2018

(65) Prior Publication Data
US 2020/0131373 A1    Apr. 30, 2020

(30) Foreign Application Priority Data

Jun. 15, 2017 (JP) .................................. 2017-117760
Feb. 8, 2018 (JP) .................................. 2018-021124

(51) Int. Cl.
*C09C 1/62* (2006.01)
*C09D 7/61* (2018.01)
(Continued)

(52) U.S. Cl.
CPC .............. *C09C 1/62* (2013.01); *C01F 17/229* (2020.01); *C01G 3/02* (2013.01); *C01G 45/02* (2013.01);
(Continued)

(58) Field of Classification Search
CPC ........... C09C 1/62; C09D 7/61; C01F 17/229; C01G 3/02; C01G 45/02; C01P 2002/32;
(Continued)

(56) References Cited

U.S. PATENT DOCUMENTS 4,134,852 A * 1/1979 Volin ....................... B01J 23/78
502/302
6,541,112 B1 * 4/2003 Swiler ................ C01G 45/1221
423/263

(Continued)

FOREIGN PATENT DOCUMENTS

| CN | 101151216 A | 3/2008 |
| CN | 104024341 A | 9/2014 |

(Continued)

OTHER PUBLICATIONS

Office Action dated Jan. 30, 2020 in Korean Application No. 10-2019-7036093.
(Continued)

*Primary Examiner* — Pegah Parvini
(74) *Attorney, Agent, or Firm* — Harness, Dickey & Pierce, P.L.C.

(57) ABSTRACT

Provided are a black mixed oxide that contains chromium per se of any valency as a main component, and fails to contain cobalt as the main component material, and has a high safety, an excellent color tone and economical efficiency, and a method for producing the same, and various products using the black mixed oxide material. The mixed oxides comprise oxides containing La, Mn and Cu as main
(Continued)

components but containing neither Cr nor Co as a main component, wherein the contents of La, Mn and Cu in the mixed oxides satisfy the following ratios, as oxide equivalent amount with respect to 100% by weight of the oxide equivalent amount: the La content as $La_2O_3$ being 35-70 wt %; the Mn content as $MnO_2$ being 25-60 wt %; and the Cu content as CuO being 0.5-10 wt %.

21 Claims, 8 Drawing Sheets

(51) Int. Cl.
    *C01F 17/229* (2020.01)
    *C01G 3/02* (2006.01)
    *C01G 45/02* (2006.01)

(52) U.S. Cl.
    CPC ............ *C09D 7/61* (2018.01); *C01P 2002/32* (2013.01); *C01P 2002/34* (2013.01); *C01P 2002/72* (2013.01); *C01P 2004/61* (2013.01)

(58) Field of Classification Search
    CPC .............. C01P 2002/34; C01P 2002/72; C01P 2004/61
    See application file for complete search history.

(56) References Cited

U.S. PATENT DOCUMENTS

| | | | | |
|---|---|---|---|---|
| 2007/0031314 A1* | 2/2007 | Axon | ....................... | B01J 23/83 423/392 |
| 2011/0068308 A1* | 3/2011 | Takaoka | ................... | C09D 7/62 252/587 |
| 2014/0318416 A1* | 10/2014 | Yamane et al. | ........... | C09C 1/24 106/459 |

FOREIGN PATENT DOCUMENTS

| | | | | |
|---|---|---|---|---|
| EP | 1162175 | A1 | 12/2001 | |
| EP | 1 873 118 | * | 3/2006 | ............ C01G 51/00 |
| JP | 4-254419 | A | 9/1992 | |
| JP | 6-144871 | A | 5/1994 | |
| JP | 6-340447 | A | 12/1994 | |
| JP | 8-113754 | A | 5/1996 | |
| JP | 2000-264639 | A | 9/2000 | |
| JP | 2002-020140 | A | 1/2002 | |
| JP | 2002-38048 | A | 2/2002 | |
| JP | 2007-217544 | A | 8/2007 | |
| JP | 4035673 | B2 | 1/2008 | |
| JP | 2010-77197 | A | 4/2010 | |
| JP | 5131664 | B2 | 1/2013 | |
| JP | 2015-98509 | A | 5/2015 | |

OTHER PUBLICATIONS

Petrov et al., "Phase Relations in the La(Sr)—Mn—Cu—O System and Oxygen Nonstoichiometry of Copper-Substituted Lanthanum Manganates", Electrochemical Proceedings, vol. 97-18, pp. 927-936, 1997.

International Search Report and Written Opinion dated Aug. 21, 2018 in International Application No. PCT/JP2018/021875.

Notice of Reasons for Refusal dated May 14, 2019 in Japanese Application No. 2018-021124.

Decision to Grant a Patent dated Sep. 17, 2019 in Japanese Application No. 2018-021124.

Extended European Search Report dated May 26, 2020 in European Application No. 18816653.2.

First Office Action dated May 9, 2020 in Chinese Application No. 201880036637.2.

* cited by examiner

BLACK MIXED OXIDE MATERIAL AND METHOD FOR MANUFACTURING SAME

CROSS-REFERENCE TO RELATED APPLICATIONS

This application is a National Stage Application of International Application No. PCT/JP2018/021875, filed Jun. 7, 2018, which claims priority to Japanese Application No. 2017-117760, filed on Jun. 15, 2017 and Japanese Application No. 2018-021124, filed on Feb. 8, 2018, the entire contents of each of which are incorporated herein by reference.

TECHNICAL FIELD

The present invention relates to a black mixed oxide material that fails to contain chromium and cobalt as main components and a manufacturing method for the same, and a product using the same.

BACKGROUND ART

Inorganic black pigments are used in various fields, such as a pottery, a pigment, coloring of a resin and a pigment component of a glass paste. For example, a glass paste obtained by using a black pigment is used for a ceramic paste that configures a coating film of a circumferential edge portion of a window glass for a vehicle (see Patent Literature 1), and an insulating paste for insulating barriers of a plasma display (see Patent Literature 2), for example. Most of conventional black pigments contain chromium (Cr) as a constituent. $Cr_2O_3$ that is a chromium compound has been used heavily as one of starting oxide materials indispensable to manufacture a black pigment, such as being contained for improvement in heat resistance of a pigment, and adjustment of a color tone.

However, "the restriction of the use of certain hazardous substances in electrical and electronic equipment" are enforced now in EU for the purpose of minimizing danger affecting environments or human bodies in all stages from production to disposal of electricity and electronic equipment. Generally, this is referred to as RoHS Directive (the abbreviation for RoHS: Restriction of Hazardous Substances). In the RoHS Directive, use of hazardous substances is forbidden in principle and designated six substances are lead (Pb), mercury (Hg), cadmium (Cd), hexavalent chromium ($Cr^{6+}$), polybrominated biphenyl (PBB), and polybrominated diphenyl ether (PBDE).

When carrying out product development pursuant to the RoHS Directive, ingredient components to be used for parts that constitute a product, and materials, for example, must be also thoroughly managed so that the above-mentioned six substances whose use is forbidden are not contained in a product. Regulation of hazardous chemical substances in view of such an environmental problem has been spread not only in EU countries but in every country in the world.

Cr generally contained as a starting oxide material of pigments changes to hexavalent chromium ($Cr^{6+}$) having strong toxicity by addition of heat, for example. In manufacturing processes of pigments, flush processing, for example, is performed if necessary, so that hexavalent chromium generated is removed. However, chromium may be partially changed to hexavalent chromium again by passing through the drying step at about 180° C. For this reason, a black pigment per se which is a product may pose a problem. Moreover, depending on the use of a pigment, the pigment may be subject to heating and ultraviolet-ray exposure according to the operating condition. In such a case, a possibility that Cr contained in a black pigment is changed from trivalent ($Cr^{3+}$) to hexavalent ($Cr^{6+}$) by temporal change cannot be completely denied.

In the current RoHS Directive, only hexavalent chromium is taken as a target of regulation. However, when a product in which a black pigment containing chromium is used is disposed, safety with change of valency has been beginning to be regarded as questionable. Ultimately, attention to black pigments that fail to contain chromium component per se (see Patent Literature 3) has been increasingly paid. For the black pigment disclosed in Patent Literature 3, a strontium compound and ferric oxide are used as main components. Since solubility of strontium into water is high, a substantial manufacturing method is limited to a nonaqueous fluid or alcohol. Therefore, costs for manufacturing a pigment may increase, and range to be used and a use also may be considerably limited.

Furthermore, improvement is repeated to the combination and techniques used for manufacturing a black pigment, and a new black pigment which fails to contain chromium per se has been proposed (Patent Literatures 4 and 5). The black pigment disclosed in Patent Literature 4 is a pigment that contains oxides of Mn, Co, Ni and Fe as main components. The black pigment disclosed in Patent Literature 5 is a pigment that contains oxides of Mn, Fe, Cu and Co as main components. In particular, an excellent black color was obtained according to the black pigment disclosed in Patent Literature 5.

As described above, in connection with the necessity of management for the hazardous chemical substances contained in a product, a pigment containing a component that fails to contain chromium was able to be obtained. However, cobalt is contained as one of the main components, as described above. Cobalt is known as a cause of allergies and is desired to decrease out of composition of the main components as much as possible. Accordingly, it has been anxious for a new component-based pigment that fails to contain chromium in the main components from a view point of environment-friendly, and fails to contain cobalt, on the assumption that an excellent black color required for black pigments is present.

CITATION LIST

Patent Literature

[Patent Literature 1]
  Japanese Unexamined Patent Application No. H06-340447
[Patent Literature 2]
  Japanese Unexamined Patent Application No. H06-144871
[Patent Literature 3]
  Japanese Unexamined Patent Application No. 2000-264639
[Patent Literature 4]
  Japanese Unexamined Patent Application No. 2007-217544
[Patent Literature 5]
  Japanese Patent No. 5131664

SUMMARY OF INVENTION

Technical Problem

In view of the above circumstances, inventors reviewed the main components of black pigments and investigated wholeheartedly. As a result, at last a black pigment having a main component composition failing to contain chromium and cobalt as the main component were able to be developed. Further, the inventors also checked that the black pigment had other physical properties in addition to the performance desired for a black pigment.

The present invention is made in view of the above-mentioned point, and provides a black mixed oxide material which fails to contain chromium per se of any valency as a main component, and also fails to contain cobalt as a main component, has a high safety and excellent color tone, and is economically advantageous, and a method of manufacturing the same, and also provides various products in view of physical properties that the black mixed oxide material has.

Solution to Problem

A first aspect of the black mixed oxide material of the present invention is directed to a black mixed oxide material containing an oxide containing La, Mn and Cu as main components and being a mixed oxide that fails to contain Cr and Co as the main components.

A second aspect of the black mixed oxide material of the present invention is that the mixed oxide has a perovskite phase exhibiting a maximum intensity diffraction peak in a range of 31° to 34° of a diffraction angle 2θ in X-ray diffraction measurement using CuKα ray as an X-ray source, and the mixed oxide contains $Mn_3O_4$ that has a spinel structure, as an oxide of Mn.

A third aspect of the black mixed oxide material of the present invention is that the black mixed oxide material in which the contents of La, Mn and Cu in the mixed oxide satisfy the following ratio: 35 to 70% by weight as $La_2O_3$; and 25 to 60% by weight as $MnO_2$; and 0.5 to 10% by weight as CuO, respectively, as oxide equivalent amounts in which the total weight is 100% by weight.

A fourth aspect of the black mixed oxide material of the present invention is that the mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount.

A fifth aspect of the black mixed oxide material of the present invention is that the mixed oxide contains any one or more of Li, B, Na, Mg, Al, Si, P, K, Ca, Ti, V, Fe, Zn, Sr, Y, Zr, Nb, Sn, Sb, Ba, Ta, W, Bi, Ce, Pr, Nd or Er as accessory components besides the main components, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains $Li_2O$, $B_2O_3$, $Na_2O$, MgO, $Al_2O_3$, $SiO_2$, $P_2O_5$, $K_2O$, CaO, $TiO_2$, $V_2O_5$, $Fe_3O_3$, ZnO, SrO, $Y_2O_3$, $ZrO_2$, $Nb_2O_3$, $SnO_2$, $Sb_2O_3$, BaO, $Ta_2O_5$, $WO_3$, $Bi_2O_3$, $CeO_2$, $Pr_6O_{11}$, $Nd_2O_5$ or $Er_2O_3$ as the accessory components at a ratio of 20% by weight or less with respect to 100% by weight of the oxide equivalent amount.

A sixth aspect of the black mixed oxide material of the present invention is that the mixed oxide is a black pigment.

A seventh aspect of the black mixed oxide material of the present invention is that the mixed oxide is a nonmagnetic material.

An eighth aspect of the black mixed oxide material of the present invention is that the mixed oxide is an insulating material.

A ninth aspect of the black mixed oxide material of the present invention is a method of manufacturing the black mixed oxide material for obtaining a mixed oxide that includes a primary grinding step of mixing and grinding starting oxide materials of La, Mn and Cu to obtain a primary ground product with an average particle diameter of 5 μm or less, a material baking step of baking the primary ground product at 700° C. to 1200° C. to obtain a baked starting material, and a secondary grinding step of grinding the baked starting material to allow the baked starting material to have an average particle diameter of 50 μm or less.

A tenth aspect of the black mixed oxide material of the present invention is that the method of manufacturing the black mixed oxide material in which the contents of La, Mn and Cu in the mixed oxide satisfy the following ratio: 35 to 70% by weight as $La_2O_3$; and 25 to 60% by weight as $MnO_2$; and 0.5 to 10% by weight as CuO, respectively, in an oxide equivalent amounts in which the total weight is 100% by weight.

An eleventh aspect of the black mixed oxide material of the present invention is the method of manufacturing the black mixed oxide material in which the mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount.

A twelfth aspect of the black mixed oxide material of the present invention is directed to a method of manufacturing the black mixed oxide material for obtaining a mixed oxide that includes a first grinding step of mixing and grinding oxide materials of La, Mn and Cu to obtain a first ground product with an average particle diameter of 5 μm or less, a first baking step of baking the first ground product at 700° C. to 1200° C. to obtain a first baked product, a second grinding step of grinding the first baked product to obtain a second ground product with an average particle diameter of 50 μm or less, a second baking step of baking the second ground product at 600° C. to 1100° C. to obtain a second baked product, and a third grinding step of grinding the second baked product to allow the second baked product to have an average particle diameter of 20 μm or less.

A thirteenth aspect of the black mixed oxide material of the present invention is that the contents of oxides of La, Mn and Cu in the mixed oxide satisfy the following ratio: 35 to 70% by weight as $La_2O_3$; and 25 to 60% by weight as $MnO_2$; and 0.5 to 10% by weight as CuO, respectively, in an oxide equivalent amounts in which the total weight is 100% by weight.

A fourteenth aspect of the black mixed oxide material of the present invention is that the mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount.

A fifteenth aspect of the black mixed oxide material of the present invention is directed to an inorganic ceramic material containing the black mixed oxide material, and a ceramic agent.

A sixteenth aspect of the black mixed oxide material of the present invention is directed to an inorganic glass paste containing the black mixed oxide material, and a glass agent.

A seventeenth aspect of the black mixed oxide material of the present invention is directed to a baking product which is obtained by baking the inorganic glass paste on a glass member, a metallic member, a china, or porcelain.

An eighteenth aspect of the black mixed oxide material of the present invention is directed to a resin paste containing the black mixed oxide material, and a resin agent.

A nineteenth aspect of the black mixed oxide material of the present invention is directed to a coated product which is obtained by coating the resin paste, to a base material.

A twentieth aspect of the black mixed oxide material of the present invention is that the coated product in which the base material is a glass, a metal, a china, porcelain, a resin product, or a carbon material.

A twenty-first aspect of the black mixed oxide material of the present invention is directed to a resin member which contains the black mixed oxide material and a resin agent.

Advantageous Effects of Invention

According to the black mixed oxide material, the black mixed oxide material contains an oxide that contains La, Mn and Cu as main components, and is a mixed oxide that fails to contain Cr and Co as the main components, and thus the black mixed oxide material fails to contain chromium per se in the main components of any valency, and also fails to contain cobalt in the main components, and has a high safety, excellent color tone, and economical efficiency.

The mixed oxide has a perovskite phase exhibiting a maximum intensity diffraction peak in a range of 31° to 34° of a diffraction angle 2θ in X-ray diffraction measurement using CuKα ray as an X-ray source, and the mixed oxide contains $Mn_3O_4$ that has a spinel structure, as an oxide of Mn, and thus, the mixed oxide is in a form of a sintered mixed oxide.

The black mixed oxide material in which the contents of La, Mn and Cu in the mixed oxide satisfy the following ratio: 35 to 70% by weight as $La_2O_3$; and 25 to 60% by weight as $MnO_2$; and 0.5 to 10% by weight as CuO, respectively, in an oxide equivalent amount in which the total weight is 100% by weight, and thus, the black mixed oxide material fails to contain chromium per se in the main components, and also fails to contain cobalt in the main components, an excellent black color is presented.

The mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount, and thus a more excellent black color is presented.

The mixed oxide contains any one or more of Li, B, Na, Mg, Al, Si, P, K, Ca, Ti, V, Fe, Zn, Sr, Y, Zr, Nb, Sn, Sb, Ba, Ta, W, Bi, Ce, Pr, Nd or Er as accessory components besides the main components, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains $Li_2O$, $B_2O_3$, $Na_2O$, MgO, $Al_2O_3$, $SiO_2$, $P_2O_5$, $K_2O$, CaO, $TiO_2$, $V_2O_5$, $Fe_3O_3$, ZnO, SrO, $Y_2O_3$, $ZrO_2$, $Nb_2O_3$, $SnO_2$, $Sb_2O_3$, BaO, $Ta_2O_5$, $WO_3$, $Bi_2O_3$, $CeO_2$, $Pr_6O_{11}$, $Nd_2O_5$ or $Er_2O_3$ as the accessory components at a ratio of 20% by weight or less with respect to 100% by weight of the oxide equivalent amount, and thus it is not necessary to use the materials of high purity or to use the special manufacturing control and method for avoiding mixing of impurities, and can make materials and a manufacturing cost comparatively reasonable.

Since the mixed oxide is a black pigment, a nonmagnetic material or an insulating material, the use of the black mixed oxide material is broader.

According to the method of manufacturing the black mixed oxide material for obtaining a mixed oxide that includes a primary grinding step of mixing and grinding starting oxide materials of La, Mn and Cu to obtain a primary ground product with an average particle diameter of 5 μm or less, a material baking step of baking the primary ground product at 700° C. to 1200° C. to obtain a baked starting material, and a secondary grinding step of grinding the baked starting material to allow the baked starting material to have an average particle diameter of 50 μm or less, the black mixed oxide material fails to contain chromium per se in the main components of any valency, and also fails to contain cobalt in the main components, and has a high safety, excellent color tone, and economical efficiency.

The contents of La, Mn and Cu in the mixed oxide satisfy the following ratio: 35 to 70% by weight as $La_2O_3$; 25 to 60% by weight as $MnO_2$; and 0.5 to 10% by weight as CuO, respectively, in an oxide equivalent amount in which the total weight is 100% by weight, and thus the black mixed oxide material fails to contain chromium per se in the main components, and also fails to contain cobalt in the main components, and an excellent black color is presented.

The mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount, and thus a more excellent black color is presented.

According to the method of manufacturing the black mixed oxide material for obtaining a mixed oxide, the method includes a first grinding step of mixing and grinding starting oxide materials of La, Mn and Cu to obtain a first ground product with an average particle diameter of 5 μm or less, a first baking step of baking the first ground product at 700° C. to 1200° C. to obtain a first baked product, a second grinding step of grinding the first baked product to obtain a second ground product with an average particle diameter of 50 μm or less, a second baking step of baking the second ground product at 600° C. to 1100° C. to obtain the second baked product, and a third grinding step of grinding the second baked product to allow the second baked product to have an average particle diameter of 20 μm or less, the black mixed oxide material fails to contain chromium per se in the main components of any valency, and also fails to contain cobalt in the main components, and has a high safety, an excellent color tone, and economical efficiency.

The contents of La, Mn and Cu in the mixed oxide satisfy the following ratio: 35 to 70% by weight as $La_2O_3$; and 25 to 60% by weight as $MnO_2$; and 0.5 to 10% by weight as CuO, respectively, in an oxide equivalent amount in which the total weight is 100% by weight, and thus the black mixed oxide material fails to contain chromium per se in the main components of any valency, and also fails to contain cobalt in the main components, and an excellent black color is presented.

The mixed oxide further contains an oxide of Mo as the main component, and in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount, achieving an excellent black color.

The black mixed oxide material can be used for product for a broader field by application to a black inorganic ceramic material, a black inorganic glass paste, and a black resin paste. In view of the above, the black mixed oxide material, as a material which contains neither chromium nor cobalt, can substitute existing materials.

DESCRIPTION OF EMBODIMENTS

The black mixed oxide material of the present invention is directed to a black mixed oxide material containing a component that fails to contain Cr per se of any valency as the main components, and fails to contain Co as the main components. That is, the black mixed oxide material contains three types of components, La, Mn and Cu as main components. However, Cr and Co are not contained in the main components. Further, the black mixed oxide material is directed to a mixed oxide containing oxides of three types of main components that are metallic elements. Further, since the black mixed oxide material enhances favorable coloring when the black mixed oxide material is used as a black pigment, Mo is also blended with the main components of the three types of metallic elements to prepare a mixed oxide. In addition, as Examples described later, in addition to performance as pigments, the black mixed oxide material also has characteristics of a nonmagnetic material and an insulating material.

Figure 5:
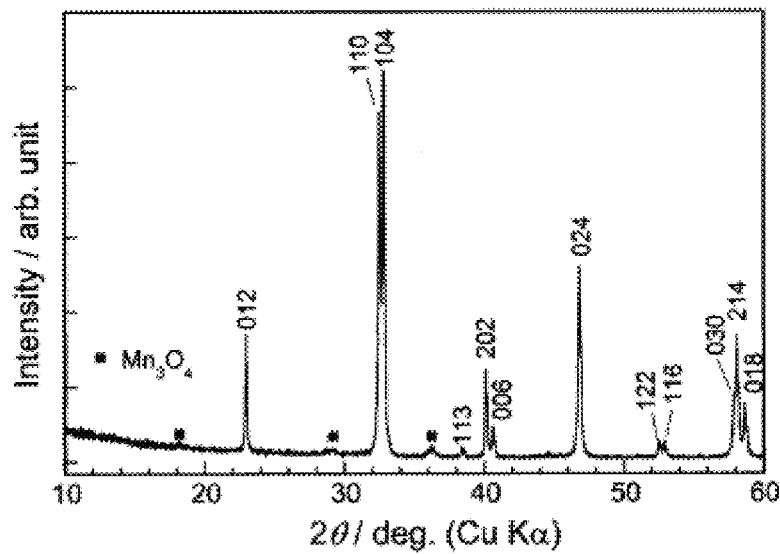
FIG. 5 is an X-ray diffraction pattern of Example 29 of trial production.
Figure 6:
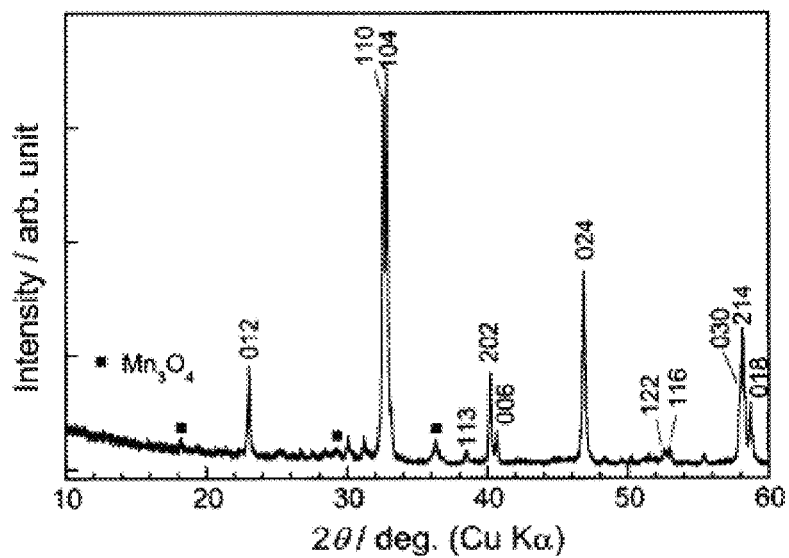
FIG. 6 is an X-ray diffraction pattern of Example 35 of trial production.
Figure 7:
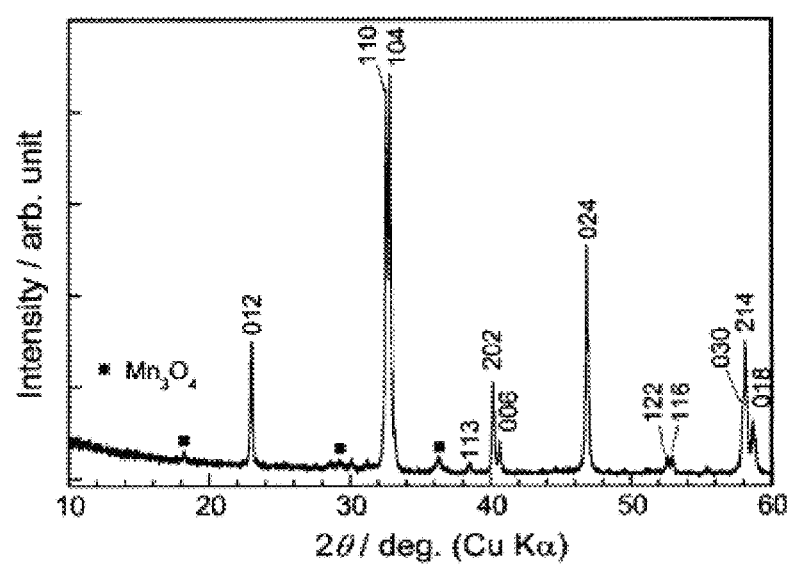
FIG. 7 is an X-ray diffraction pattern of Example 51 of trial production.

In an X-ray diffraction (XRD) measurement using a CuKα-ray as an X-ray source, a mixed oxide is shown as an X-ray diffraction pattern of FIG. 5 to FIG. 7 of Examples described later. FIGS. 5, 6 and 7 correspond to Examples 29, 35 and 51 of trial production described later, in this order. A peak peculiar to a mixed oxide is found as recognized from illustrated patterns. A maximum intensity diffraction peak exists in a range of 31° to 34° of a diffraction angle 2θ. Taking the peak into consideration, it is assumed that the mixed oxide has a perovskite phase. In addition, it is also assumed that $Mn_3O_4$ which has a spinel structure as an oxide of Mn is contained in the mixed oxide from the position of the black painted square in the illustrated patterns.

The material form of La, Mn and Cu used as the main components is not in particular limited, and in addition to each metal oxide, metallic compounds, such as carbonate and hydroxide, are also usable. Specifically, the material form of La, Mn and Cu is appropriately selected from $La_2O_3$, $La(OH)_3$, $La_2(CO_3)_3$, $MnO_2$, $Mn_3O_4$, $MnCO_3$, $Mn(OH)_2$, natural manganese dioxide ground product (including $MnO_2+Fe_2O_3$), CuO, $Cu_2O_3$, $CuCO_2$, $Cu(OH)_2$, for example. In a composition containing Mo as the main components, the material form is appropriately selected from $MoO_2$, $MoO_3$ and $Mo(CO)_6$. Note that these material forms are combined if needed.

The black mixed oxide material shows the peak of the X-ray diffraction pattern as illustrated, and the black mixed oxide material is also found to be a form of the sintered mixed oxide. Accordingly, the blending amount established between main components La, Mn and Cu of a mixed oxide can be expressed by a relative ratio in an oxide equivalent amount when each of the metallic elements is in the form of the following oxides.

Figure 3:
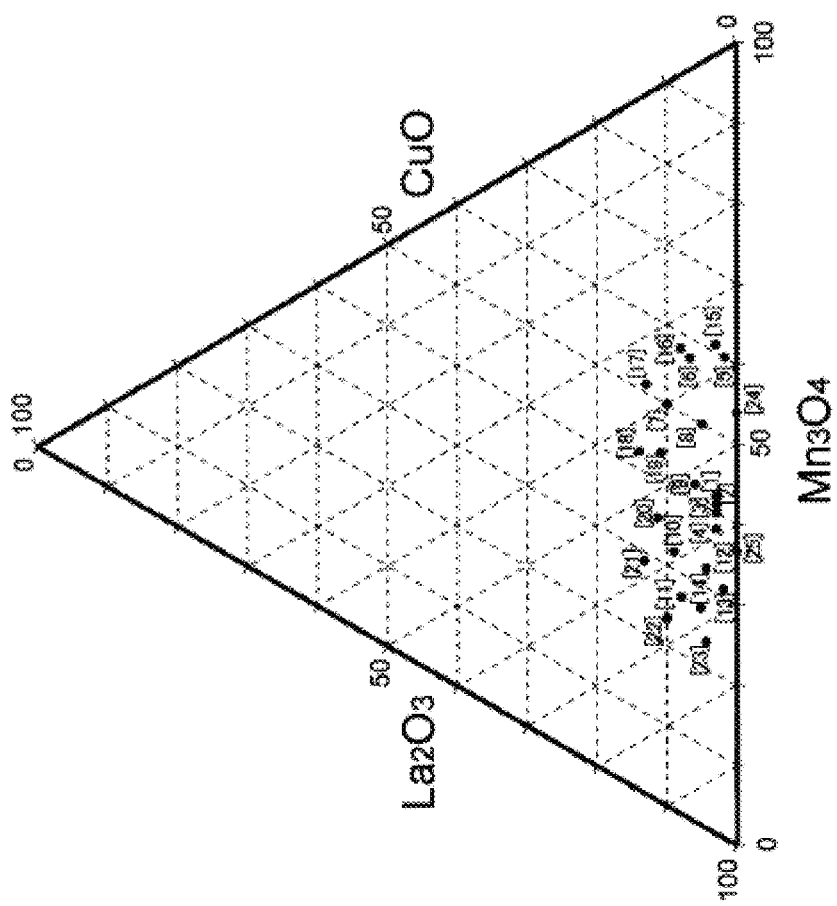
FIG. 3 is a triangular figure when the main components in the black mixed oxide material are presented in an oxide equivalent amount.

In the oxide equivalent amount, the mixed ratio of the oxides of La, Mn and Cu which are the main components are drawn from the triangular figure of FIG. 3 in Examples described later. The triangular figure shows balance of the quantity established between the oxides of the black pigments which are the mixed oxides of examples of trial production described later. Specifically, as oxide forms, La is grasped as $La_2O_3$, Mn is grasped as $MnO_2$ and Cu is grasped as CuO. Accordingly, the total weight of sum of three types of oxides is converted to 100% by weight. Further, the ratio of $La_2O_3$ is within a range of 35 to 70% by weight, the ratio of $MnO_2$ is within a range of 25 to 60% by weight, and the ratio of CuO is within a range of 0.5 to 10% by weight. When the oxides of each of the metallic elements converge on the range shown above, an excellent black color is presented. Therefore, as a use of the black mixed oxide material, a pigment is leading.

The ratio of the metallic elements that are main components is an expediently calculated value when each of the metallic elements is considered to correspond to a type of the above-mentioned oxides. For this reason, actually, whole sum of percentages of the oxides of main components La, Mn and Cu may exceed 100, or be less than 100. This is because change of the purity of the materials used as the basis of elements that are main components, mixing of the accessory component described later, and the number of oxidizations in a pigment (the number of oxygen elements), for example, are supposed. Once converting metallic elements that are main components into weights of oxides facilitates grasping of quality of a black color and balance of blending amount between mutual metallic elements. In addition, converting metallic elements that are main components into weights of oxides facilitates grasping of quantity and a ratio in case where other components are further added.

The more the blending amount of $La_2O_3$ which is an oxide of La, the higher the concentration becomes and the higher blackness becomes. When the equivalent weight of $La_2O_3$ is less than 35% by weight, desired blackness decreases. When the equivalent weight of $La_2O_3$ exceeds 70% by weight, the blending amounts of materials other than $La_2O_3$ decrease, and it becomes impossible to keep the stability of the quality by other components. Accordingly, the blending ratio of $La_2O_3$ is preferably 35 to 70% by weight, and the blending ratio of $La_2O_3$ is more preferably 40 to 70% by weight.

The more the blending amount of $MnO_2$ which is an oxide of Mn, the higher the concentration becomes and the higher the blackness as a black pigment increases. When the equivalent weight of $MnO_2$ is less than 25% by weight, an excellent black color cannot be obtained like a case of La. When the equivalent weight of $MnO_2$ exceeds 60% by weight, the blending amounts of materials other than $MnO_2$ decrease and it becomes impossible to keep the stability of the quality by other components. Accordingly, $MnO_2$ is preferably 25 to 60% by weight.

CuO which is an oxide of Cu can present excellent black coloring as well as the oxides of above-mentioned La and Mn. When the equivalent weight of CuO is less than 0.5% by weight, color tones other than black increase and it becomes difficult to produce the concentration of pigments, and the black taste. When the equivalent weight of CuO exceeds 10% by weight, if a use of the black pigment is assumed from a relation with other components, redness increases and concentration will no longer be obtained. The fusion temperature of a ceramic paste containing the mixed oxide material rises. Further, acid resistance falls. Accordingly, Cu is added in view of balance of various conditions, and CuO is preferably 0.5 to 10% by weight.

In addition to the mixed oxide (three-type main component-based) of La, Mn and Cu, the oxide of Mo is also contained as a type of the main components (four-type main component-based). With addition of Mo, the mixed oxide can serve as a more excellent black pigment. In the four-type main components-based mixed oxide, in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount. In contrast, when the equivalent weight of $MoO_3$ exceeds 5% by weight, black concentration begins to fall. Therefore, the upper limit of the equivalent weight of $MoO_3$ is 5% by weight. The lower limit of the equivalent weight of $MoO_3$ is not especially limited. However, 0.01% by weight or more is preferred from a viewpoint of clarifying the effect by addition of Mo.

In the black mixed oxide material of a mixed oxide (three-type main component-based) that contains La, Mn and Cu as main components, or a mixed oxide (four-type main component-based) which also contains Mo in the mixed oxide (three-type main component-based), any one or more types of Li, B, Na, Mg, Al, Si, P, K, Ca, Ti, V, Fe, Zn, Sr, Y, Zr, Nb, Sn, Sb, Ba, Ta, W, Bi, Ce, Pr, Nd, or Er is selectively contained as accessory components besides the main components.

The content of the above-mentioned accessory components is specified to 20% by weight or less with respect to oxide equivalent amounts in which the total weight of three types of oxides of $La_2O_3$, $MnO_2$, and CuO (total of $La_2O_3$, $MnO_2$ and CuO) is 100% by weight in an oxide equivalent amount of $Li_2O$, $B_2O_3$, $Na_2O$, MgO, $Al_2O_3$, $SiO_2$, $P_2O_5$, $K_2O$, CaO, $TiO_2$, $V_2O_5$, $Fe_2O_3$, ZnO, SrO, $Y_2O_3$, $ZrO_2$, $Nb_2O_3$, $SnO_2$, $Sb_2O_3$, BaO, $Ta_2O_5$, $WO_3$, $Bi_2O_3$, $CeO_2$, $Pr_6O_{11}$, $Nd_2O_5$, or $Er_2O_3$.

The effect of promoting the crystal growth of the mixed oxide generated by the reaction of the oxides of ingredients by containing these accessory components is expected. It seems that the effect contributes to adjustment of sintering temperature, and the stability of the tone of a pigment, for example. Therefore, the special manufacturing management and method for avoiding use of the materials of extremely high purity and mixing of impurities are also reduced. Therefore, materials and a manufacturing cost are comparatively suppressed. Actually, exclusion of mixing the auxiliary feedstocks at the time of production in mass-production scale is extremely difficult. When an accessory component exceeds 20% by weight, the characteristics of a desired black pigment are degraded, which is not favorable, and thus the contents of accessory components are preferably little. However, although the action to which an accessory component contributes is unknown, there is also an example in which the improvement in performance by addition of the accessory component is also found as clear from Examples described later.

Hereinafter, the method of manufacturing the black mixed oxide material of a first embodiment will be described using an outline flowchart of FIG. 1. First, starting oxide materials M of La, Mn and Cu (Mo can also be included) which satisfy the above-mentioned oxide equivalent amount are prepared. The starting oxide materials M are mixed, ground to obtain a primary ground product 11 with an average particle diameter of 5 μm or less (S11: primary grinding step). The primary ground product 11 is baked under the oxidative atmosphere of 700° C. to 1200° C. to obtain a baked starting material 12 (S12: material baking step). The baked starting material 12 is again ground to allow the baked starting material to have the average particle diameter of 50 μm or less to prepare a mixed oxide P1 of a black mixed oxide material (S13: secondary grinding step).

Figure 2:
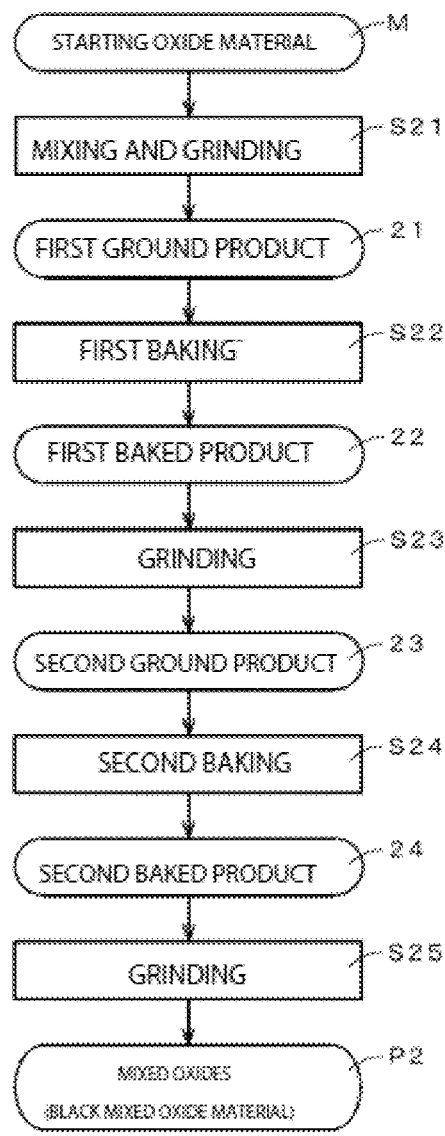
FIG. 2 is an outline flowchart of a method of manufacturing a black mixed oxide material according to a second embodiment.

Next, the method of manufacturing the black mixed oxide material of a second embodiment will be also described using an outline flowchart of FIG. 2. Oxide materials M of La, Mn and Cu (Mo can be included) which satisfy the above-mentioned oxide equivalent amount are prepared. The starting oxide materials M are mixed, ground to obtain a first ground product 21 with an average particle diameter of 5 μm or less (S21: first grinding step). The first ground product 21 is baked under the oxidative atmosphere of 700° C. to 1200° C. to obtain the first baked product 22 (S22: first baking step). The first baked product 22 is ground to have the average particle diameter of 50 μm or less to obtain a second ground product 23 (S23: second grinding step). The second ground product 23 is baked under the oxidative atmosphere of 600° C. to 1100° C. to obtain a second baked product 24 (S24: second baking step). Then, the second baked product 24 is ground to allow the baked starting material to have an average particle diameter of 5 μm or less to prepare a mixed oxide P2 of the black mixed oxide material (S25: third grinding step).

Figure 1:
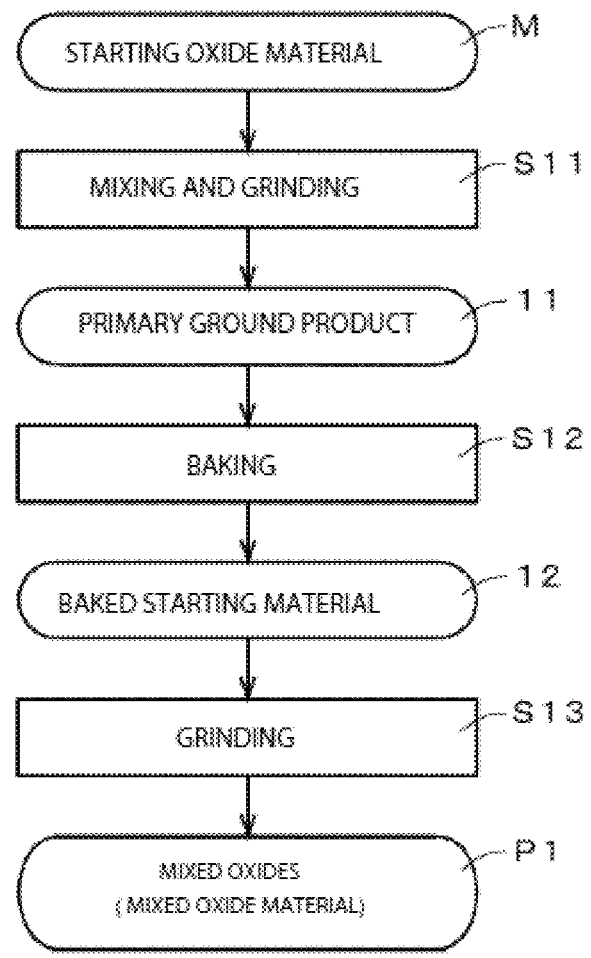
FIG. 1 is an outline flowchart of a method of manufacturing a black mixed oxide material according to a first embodiment.

In grinding (S11, S13, S21, S23 and S25) shown in the outline flowcharts of FIG. 1 and FIG. 2, a grinding apparatus, such as a ball mill, a vibrating mill, an attritor, a bead mill, a jet mill, a tube mill, an atomizer, a fine mill and a pulverizer, is used. In grinding, both of a wet or dry mixing and grinding are possible, so that productivity is high, and advantageous also in processing cost. For example, the wet mixing and grinding method in a ball mill is described. Starting oxide materials, water, a ball and a grinding aid (a dispersing agent, and an antifoaming agent, for example) or the like is thrown into a ball mill, and mixing and grinding is performed. A known antifoaming agent, and a dispersing agent, for example, that serve as a grinding aid can be appropriately selected and used so that mixing and grinding of the starting oxide materials may be uniformly carried out. The blending amounts are adjusted depending on the starting oxide materials.

A lining material, such as alumina, zirconia, rubber, urethane, nylon, and silicic anhydride, is laid on the inner surface of a ball mill. As compared with other lining materials, hardness is high, and alumina and zirconia can decrease mixing of the lining material into a pigment, and shortening of grinding time is possible, and thus alumina and zirconia are preferred.

An alumina ball, a zirconia ball, a porcelain ball, a steel ball or the like are used for a grinding steel ball. A zirconia ball is also used for lining of urethane or nylon. It is because there is little possibility of mixing of impurities since urethane and nylon carbonize and disappear at the time of baking. The particle diameter of a grinding steel ball is appropriately changed according to the size of the particle diameter of a starting oxide material.

In addition to ammonium polyacrylate and sodium polyacrylate which are a polycarboxylic acid-based compound and a polyacrylic acid-based compound, the dispersing agent which is one of the grinding aids is selected from sodium polycarboxylate, and a sulfonic acid-based polymer (sodium salt), for example. By suitably adding the grinding aid, dispersibility of a starting oxide material in the liquid becomes excellent, and the starting oxide material can be ground comparatively small in a short time. Obviously, specific gravity differs for every starting oxide material of the main components. For this reason, deviation of grinding need to be prevented and all components need to be equally ground. Since ammonium polyacrylate is mostly decomposed by baking and there is also no residue for sodium as compared with other grinding aids, ammonium polyacrylate is preferably used.

In grinding (S11, S13), the average particle diameter of the starting oxide materials after grinding is ground to allow the average particle diameter of the starting oxide materials to have a size of 5 μm or less, and further 2 μm or less, preferably 1 μm or less, more preferably 0.7 μm or less. This is because the grinding is performed for urging the particle growth thanks to sintering the mixed oxide generated at the time of baking by making average particle diameter as small as possible. This is because the smaller the average particle diameter, the higher the reactivity of the starting oxide material and the easier obtaining a mixed oxide having a preferred crystal structure is. The smaller the average particle diameter is, the longer the grinding time is, so that the average particle diameter is specified taking performance, baking time or the like for which pigments are required into consideration.

The phrase "average particle diameter" herein means the particle diameter (accumulation mean diameter) in 50% of the integrated value in the particle diameter distribution calculated by laser diffraction and a scattering method using the laser diffraction, a scattering type particle diameter and a particle size distribution measuring device of Examples described later.

The ground product obtained after wet grinding is thrown into a slurry tank, and is dried with a spray drier, a filter press (dehydrating drier), a decanter (centrifugal separation dehydrating drier) or the like. Moisture content is 1.0% or less, preferably 0.5% or less. Since drying and grinding are newly needed in using a filter press, a decanter, or the like when drying, use of a spray drier is preferred on the facilities of a process. A drying step may be omitted depending on the amount of moisture after mixed grinding or the like.

In grinding (S13, S23) after the baking in flowcharts 1 and 2, the baked product is ground so that the baked product has an average particle diameter of 50 μm or less. Of course, the particle diameter at the time of grinding may be made finer than 50 μm if needed. The first embodiment completes after grinding of S13. So, in grinding of S13, the average particle diameter according to a use or the like is selected. Regarding grinding (S23) of FIG. 2 (the second embodiment), heat exposure at the time of the following baking is taken into consideration, and intentionally, the crystal of a mixed oxide is enlarged to be adjusted.

In grinding (S25) after baking in flowchart 2, the baked product is ground to the average particle diameter of 20 μm or less, and further 5 μm to 10 μm or less, preferably the average particle diameter of 0.5 to 2 μm, more preferably to the average particle diameter of 0.8 μm to 1 μm. The average particle diameter of the black mixed oxide material gets smaller by grinding after baking. As a result, specific surface area gets larger, the concentration gets higher, and further a color tone becomes more uniform, whereby a pigment having favorable reproducibility can be manufactured. A grinding apparatus is used for grinding after baking by the same technique as the above-mentioned grinding. When performing ball milling by wet process or the like, drying with a spray drier or the like is possible as occasion demands. By drying, when a pigment condenses, the condensed pigment can be ground using an impact grinding apparatus, such as a jet mill, a vibrating mill, and a hammermill.

The baking of S12, S22 and S24 in flowcharts 1 and 2 is also called calcination. In the baking, starting oxide materials (ground products) are thrown into a saggar which is made of mullite, cordylite, and alumina, for example. By passing through baking, a mixed oxide is generated from the starting oxide materials. The color tone and concentration of the black mixed oxide material change with the crystal growth of the mixed oxide and the degree of elaboration. When the black mixed oxide material is a black pigment, after considering the use and the performance, the baking temperature, and the baking time, for example, are appropriately selected according to each of the starting oxide materials to be contained.

In addition, when baking (S12, S22) in the manufacturing method of the black mixed oxide material of the first and second embodiments, comparatively large-sized baking apparatus, such as a tunnel kiln, a roller hearth kiln, a rotary kiln, and a shuttle kiln, are also used for mass-production. In using a large-sized baking apparatus generally, unevenness tends to be generated in sintering of the starting oxide materials. Accordingly, a baking stage can be carried out under an oxidative atmosphere by introducing heating air and heating oxygen gas, for example, into each of the above-mentioned kilns. For this reason, it is convenient when manufacturing black pigments with uniform quality at low cost and in large quantities. When using a rotary kiln, a mixed ground product is directly thrown into a kiln. In the temperature region of 700° C. to 1200° C., the baking is performed over 1 to 8 hours, although the conditions of the baking depend on the scale of a baking apparatus, and amounts of starting oxide materials. Baking time is the maintenance time of the highest temperature. In order to complete processing by baking once, a temperature gradient may be established in a baking apparatus.

For baking (S24) the starting oxide materials in the manufacturing method of the black mixed oxide material of the second embodiment, an electric furnace is used other than a tunnel kiln or the like. Since temperature control of an electric furnace is easier than that of the above-mentioned kilns, the quantity of heat added to the starting oxide materials at the time of baking can be accurately controlled. For example, it is convenient when the metal oxides of materials are subject to sintering to grow up a crystal of a mixed oxide, and in adjusting heat history (heating temperature, heating time) of materials. When using an electric furnace, the starting oxide materials are heated in a state where the starting oxide materials are left to stand. For this reason, the amount of contact of materials and oxygen may become uneven and enough oxidization is enabled by repeating baking twice.

When the black mixed oxide material is a black pigment, quality is influenced by the crystal structure that develops at the time of sintering. Therefore, when priority is given to stabilization of characteristics, it is more desirable to employ the manufacturing method of the second embodiment. The first baking step is carried out in a temperature range of 600° C. to 1200° C. for 1 to 6 hours, the second baking step is carried out in a temperature range of 600° C. to 1100° C. for 1 to 4 hours, and for each of the temperature regions and the times, the composition of the starting oxide materials that is subject to baking and sintering performance with the composition or the like are taken into consideration. The times of the first baking step and the second baking step correspond to the maintenance times of each highest temperature.

As understood from the above description of the main components, the black mixed oxide material fails to contain chromium per se of any valency in the main components, and is considerably excellent in safety while the black mixed oxide material is very economical. In manufacturing processes, such as the conventional pigments, in order to remove the hexavalent chromium ($Cr^{6+}$) generated, it was required to establish a flush process, but it is possible to omit this flush process. The accompanying drying and grinding steps can also be omitted. Therefore, production time is considerably shortened and reduction of a large manufacturing cost is achieved. In addition, since it is not necessary to use expensive materials in extremely high purity also for starting oxide materials and comparatively reasonable materials can be used, which is very advantageous in costs of ingredients.

In addition, since the black mixed oxide material (black pigment) which fails to contain a chromium component and a cobalt component in the main components is a nonmagnetic material and an insulating material, there is no possibility that a hexavalent chromium which is a toxic substance originates in a use or the environment and the hexavalent chromium which is a toxic substance is generated. Further, development of allergy symptoms resulting from cobalt is also decreased. As a use of such a black mixed oxide material, a resin pigment, a paint pigment, a color pigment for ceramics (including a pigment for absorption and reflection of ultraviolet rays in a windowpane for a vehicle, for example), a thermal radiation pigment, an infrared reflective pigment, coloring ceramics, and various types of other products are mentioned, for example.

Regarding the black mixed oxide material described in full detail so far, when the black mixed oxide material corresponds to a black pigment, the black mixed oxide material is used as an inorganic glass paste (black inorganic glass paste) containing a black mixed oxide material (black pigment) and a glass agent. For example, an inorganic glass paste is baked on the surface of a sheet glass, and serves as sheet glass products. Specific sheet glass products include a window glass, such as a windshield of a car, a rear glass, and a sunroof glass. The surfaces of these glasses are plastered with an inorganic glass paste. An inorganic glass paste protects the adhesives and a buffer resin object which intervenes between the above-mentioned sheet glass products and a vehicle body from ultraviolet rays, and degradation of adhesives and the buffer resin object with time is avoided. Of course, an inorganic glass paste is used for the window glass (sheet glass products) of various transportation machinery, such as a heavy industrial machine, a vessel, and an airplane other than a vehicle, and further is used also for the sheet glass products for display panels. Otherwise, the inorganic glass paste can be used for a pigment of a surface of metal, and coating. China-pigmenting to a china or porcelain ware and processing of enameling on metal are also possible.

The composition of the inorganic glass paste is, as disclosed in Japanese Unexamined Patent Publication 2002-20140 gazette and Japanese Patent No. 4035673 gazette, hyaline which contains $SiO_2$, $B_2O_3$, ZnO, $TiO_2$, $Li_2O$, $Na_2O$, $K_2O$, and $ZrO_2$, for example, is a main component. The hyaline is ground in advance to have an average particle diameter of 0.1 to 30 μm, preferably 0.5 to 20 μm, and is finished in the shape of a powder. Here, a resin of thermal decomposition nature, such as cellulosic resin and an acrylic resin, a solvent oil and fats having high-boiling points, such as a pineapple oil, the above-mentioned black mixed oxide material (black pigment), and other inorganic fillers are added here, and they are fully kneaded, and finished in the shape of a paste.

The inorganic glass paste containing the finished black mixed oxide material (black pigment) is applied to an edge portion of a sheet glass cut down in a proper shape, for example. As application on the surface of a sheet glass of an inorganic glass paste, screen printing, spray coating, and a roll coat method, for example, are employed. Among these, screen printing is comparatively simple. The sheet glass after inorganic glass paste application adheres to the surface of the sheet glass by baking after drying.

As formation of window glasses for the above-mentioned vehicles, a method of press-fitting sheet glass between molds and carrying out bending in a furnace, and a method of carrying out vacuum suction of the sheet glass to a mold to bend in a furnace, are employed. The tunnel furnace for preliminary heating from the normal temperature to a temperature of around 660° C. and the batch type furnace for bending fabrication at a temperature of 640° C. to 720° C. are connected and the sheet glass passes through both the furnaces to be molded. An inorganic glass paste is baked on the surface of the sheet glass in a preliminary heating stage. Therefore, in the formation from a tabular glass, the sheet glass products coated with an inorganic glass paste on the aspheric surface of window glass or the like are obtained.

In place of the above-mentioned glass agent, the black mixed oxide material can be blended with a ceramic agent to obtain an inorganic ceramic material. As a ceramic agent, ceramic materials, such as an aluminum oxide (alumina), partially stabilized zirconia, and fully stabilized zirconia are publicly known, for example. The components contained in the above-mentioned partially stabilized zirconia and fully stabilized zirconia are calcium oxide (calcia), magnesium oxide (magnesia), cerium oxide (ceria), aluminum oxide (alumina), or yttrium oxide (yttria). As a result, the ceramic material which presents a black color is produced.

In addition, a resin agent can be added to the black mixed oxide material to prepare a resin paste. This resin paste coats the surface of base materials, such as a glass, a metal, a china, porcelain, a resin product, or a carbon material. As a result, on the surface of a base material listed above, the black color and pattern can be drawn. The usage is the same as that of common black pigments.

Furthermore, a resin containing the black mixed oxide material can be also prepared by mixture with the black mixed oxide material and a resin agent. It is what is called coloring of resin. The degree of black color of a resin product is adjusted depending on the amount added. The color tone of resin is also controllable by the addition to a transparent resin. The resin used for a resin paste or a resin containing the black mixed oxide material is a publicly known resin, such as a thermoplastic resin and a thermosetting resin, and is not particularly limited. The use of a product, a place to be used, and endurance, for example, are taken into consideration, and the resin is appropriately selected. The resin containing the black mixed oxide material is processed into a pellet, and is used for materials of molded products, such as injection molding and extrusion molding. As described above, the black pigments of the present invention, as a mixed oxide material which contains neither chromium nor cobalt, can substitute existing black materials.

The mixed oxide described so far further has a function as a nonmagnetic material. Accordingly, the mixed oxide can serve as a black mixed oxide material having a nonmagnetic function. The mixed oxide is preferably used for avoiding magnetization or the like by including nonmagnetic characteristic and shielding magnetic power. For example, protection uses for electronic parts are assumed. In addition, the mixed oxide per se presents a black color, an application use of a product is also broad.

In addition, the mixed oxide further has a function as an insulating material. Accordingly, the mixed oxide can serve as a black mixed oxide material having an insulating function. An electric shielding effect is expected by presenting insulation by the mixed oxide. For example, protection uses for electronic parts are assumed. In addition, the mixed oxide per se presents a black color, an application use of a product is also broad.

EMBODIMENT

[Materials Used]

When producing the black mixed oxide material of each of examples of trial production, "$La_2O_3$, $Mn_3O_4$, and CuO" were used as materials for three types of main components, La, Mn and Cu. "$MoO_3$" was used for Mo. For accessory components, "FeOOH, MgO, $Al_2O_3$, $SiO_2$, $CaCO_3$, $V_2O_5$, ZnO, $SrCO_3$, $Y_2O_3$, $ZrO_2$, $BaCO_3$, $Ta_2O_5$, $Bi_2O_3$, $CeO_2$, $Pr_6O_{11}$, and $Nd_2O_5$" were used.

[Production (I) of Black Mixed Oxide Material]

The black pigments (three-type main component-based) of Examples 1 to 25 of trial production were produced according to the manufacturing method of the second embodiment disclosed in FIG. 2, changing the combination ratio in the mixed oxide of La, Mn and Cu. The relative weight ratio (% by weight) of each of components is shown in Tables 1 to 5 below.

The materials prepared to the combination for every example of trial production were thrown into a ball mill, mixed and ground. The combination in mixing and grinding is as follows: 100 parts by weight of gross weight of each of the starting oxide materials; 300 parts by weight of a steel ball (2 to 5 mm in diameter); 150 parts by weight of water and a water reducing agent (ammonium polyacrylate, manufactured by Toagosei, Co., Ltd.: "A-6114") were 0.5 to 2 parts by weight to the gross weight of the starting oxide materials. Mixing and grinding was performed in the ball mill for 15 to 20 hours to obtain a mixed ground product.

The mixed ground product was dried with a spray drier at a hot wind temperature of 280° C., and thereafter was baked by a tunnel kiln at about 1000° C. for 2 to 3 hours (first baking). After the first baking, the mixed ground product was subject to dry grinding to allow the mixed ground product to have 20 to 30 μm of mean particle diameters using an atomizer. Then, by the tunnel kiln, the mixed ground product was baked at about 900° C. for 2 to 3 hours (second baking), and was subject to dry grinding to have 1 to 1.2 μm of mean particle diameters using a fine mill and a steel ball (2 to 5 mm in diameter). The black mixed oxide material (that is, corresponds to black pigments, nonmagnetic material and an insulating material) of each of examples of trial production was obtained through a series of operations. The mean particle diameter was measured when producing examples of trial production using laser diffraction/scatter type particle diameter distribution measuring device (manufactured by Horiba, Ltd.: "LA-920") for after every grinding.

[Evaluation of the Degree of Black]

The black mixed oxide material of each of examples of trial production produced through the above-mentioned step was thrown into a ring made from alumina with an inside diameter of 40 mm and a thickness of 5 mm, and was pressed. Accordingly, a flat cylindrical measurement piece was obtained. The water-white glass plate was arranged on the measurement piece, the color difference meter (manufactured by Konica Minolta Japan Inc.: "CR-3500d") was brought into contact with the glass plate, and the degree of black (L value) in an L*a*b* color system (pursuant to JIS-Z-8729) was measured. Measurement was considered as mirror reflection processing (SEC method: remove mirror reflection light). On the occasion of quality evaluation of the degree of black, regarding "L value", examples of trial production having "L value" of 25.0 or less was evaluated as "A" that indicates an excellent-quality item, and examples of trial production in which "L value" exceeds 25.0 was evaluated as "F" that indicates an insufficient-quality item.

Each weight % of "$La_2O_3$, $Mn_3O_4$, and CuO", "L value, a value and b value", the first baking temperature and the second baking temperature (° C.), the final mean particle diameter (μm), and quality evaluation (A or F) regarding three types of main components, La, Mn and Cu were described in Tables 1 to 5.

TABLE 1

| No. of example of trial product | Example 1 of trial product | Example 2 of trial product | Example 3 of trial product | Example 4 of trial product | Example 5 of trial product |
| --- | --- | --- | --- | --- | --- |
| $La_2O_3$ (wt %) | 55 | 56 | 57 | 59 | 39 |
| $Mn_3O_4$ (wt %) | 42 | 41 | 40 | 38 | 60 |
| CuO (wt %) | 3 | 3 | 3 | 3 | 1 |
| Total (wt %) | 100 | 100 | 100 | 100 | 100 |
| L value | 19.31 | 19.77 | 20.66 | 19.67 | 18.70 |
| a value | −0.01 | 0.08 | 0.08 | 0.06 | 0.08 |

TABLE 1-continued

| No. of example of trial product | Example 1 of trial product | Example 2 of trial product | Example 3 of trial product | Example 4 of trial product | Example 5 of trial product |
|---|---|---|---|---|---|
| b value | −1.74 | −1.22 | −1.63 | −1.83 | 0.32 |
| first baking temperature(° C.) | 1000 | 1000 | 1000 | 1000 | 1000 |
| second baking temperature(° C.) | 900 | 900 | 900 | 900 | 900 |
| final average particle diameter(μm) | 1.11 | 1.08 | 1.07 | 1.10 | 1.01 |
| Quality evaluation | A | A | A | A | A |

TABLE 2

| No. of example of trial product | Example 6 of trial product | Example 7 of trial product | Example 8 of trial product | Example 9 of trial product | Example 10 of trial product |
|---|---|---|---|---|---|
| $La_2O_3$ (wt %) | 36 | 40 | 45 | 52 | 59 |
| $Mn_3O_4$ (wt %) | 57 | 50 | 50 | 42 | 32 |
| CuO (wt %) | 7 | 10 | 5 | 6 | 9 |
| Total | 100 | 100 | 100 | 100 | 100 |
| L value | 18.70 | 19.01 | 19.19 | 19.33 | 19.72 |
| a value | 0.72 | 0.18 | 0.03 | −0.05 | 0.14 |
| b value | 0.29 | 0.01 | −0.13 | −0.39 | −1.33 |
| first baking temperature(° C.) | 1000 | 1000 | 1000 | 1000 | 1000 |
| second baking temperature(° C.) | 900 | 900 | 900 | 900 | 900 |
| final average particle diameter(μm) | 1.02 | 1.03 | 1.10 | 1.09 | 1.04 |
| Quality evaluation | A | A | A | A | A |

TABLE 3

| No. of example of trial product | Example 11 of trial product | Example 12 of trial product | Example 13 of trial product | Example 14 of trial product | Example 15 of trial product |
|---|---|---|---|---|---|
| $La_2O_3$ (wt %) | 65 | 63 | 67 | 68 | 36 |
| $Mn_3O_4$ (wt %) | 27 | 32 | 31 | 27 | 61 |
| CuO (wt %) | 8 | 5 | 2 | 5 | 3 |
| Total (wt %) | 100 | 100 | 100 | 100 | 100 |
| L value | 19.99 | 20.48 | 20.51 | 20.53 | 25.11 |
| a value | 0.22 | 0.77 | 0.75 | 0.03 | 0.82 |
| b value | −1.11 | −1.02 | −1.63 | 0.50 | 0.33 |
| first baking temperature(° C.) | 1000 | 1000 | 1000 | 1000 | 1000 |
| second baking temperature(° C.) | 900 | 900 | 900 | 900 | 900 |
| final average particle diameter(μm) | 1.12 | 1.10 | 1.09 | 1.13 | 1.05 |
| Quality evaluation | A | A | A | A | F |

TABLE 4

| No. of example of trial product | Example 16 of trial product | Example 17 of trial product | Example 18 of trial product | Example 19 of trial product | Example 20 of trial product |
|---|---|---|---|---|---|
| $La_2O_3$ (wt %) | 34 | 36 | 43 | 46 | 53 |
| $Mn_3O_4$ (wt %) | 58 | 51 | 42 | 43 | 36 |
| CuO (wt %) | 8 | 13 | 15 | 11 | 11 |
| Total | 100 | 100 | 100 | 100 | 100 |
| L value | 25.15 | 25.21 | 25.29 | 25.11 | 25.22 |

TABLE 4-continued

| No. of example of trial product | Example 16 of trial product | Example 17 of trial product | Example 18 of trial product | Example 19 of trial product | Example 20 of trial product |
| --- | --- | --- | --- | --- | --- |
| a value | 0.84 | 0.80 | 0.73 | 0.42 | 0.33 |
| b value | 0.42 | 0.21 | 0.52 | 0.36 | 0.52 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 1.03 | 1.11 | 1.12 | 1.05 | 1.05 |
| Quality evaluation | F | F | F | F | F |

TABLE 5

| No. of example of trial product | Example 21 of trial product | Example 22 of trial product | Example 23 of trial product | Example 24 of trial product | Example 25 of trial product |
| --- | --- | --- | --- | --- | --- |
| $La_2O_3$ (wt %) | 58 | 67 | 72 | 47 | 63 |
| $Mn_3O_4$ (wt %) | 29 | 23 | 23 | 53 | 27 |
| CuO (wt %) | 13 | 10 | 5 | 0 | 0 |
| Total (wt %) | 100 | 100 | 100 | 100 | 100 |
| L value | 25.28 | 25.35 | 25.31 | 25.09 | 25.13 |
| a value | 0.24 | 0.21 | 0.21 | 0.81 | 0.82 |
| b value | 0.54 | 0.52 | 0.51 | 0.03 | 0.05 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 1.08 | 1.07 | 1.10 | 1.03 | 1.01 |
| Quality evaluation | F | F | F | F | F |

[Results and Consideration of Production (I) of Black Mixed Oxide Material]

Figure 4:
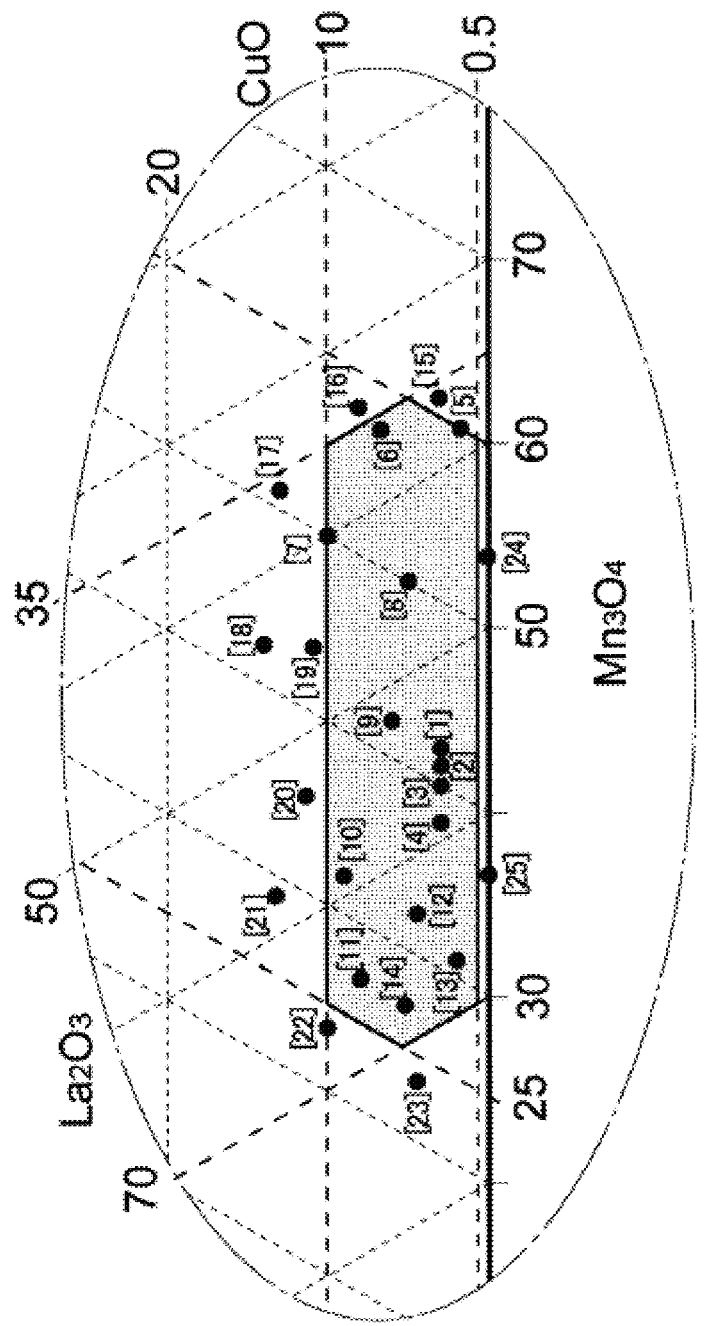
FIG. 4 is an enlarged drawing of the main portion of FIG. 3.

The results of the black mixed oxide material (three-type main component-based) of Examples 1 to 25 of trial production produced while changing the combination ratio in La, Mn and Cu in the mixed oxide are shown in Tables 1 to 5. Examples 1 to 14 of trial production were evaluated as excellent (A) in the degree of black. Examples 15 to 25 of trial production were evaluated as insufficient (F) in the degree of black. In addition, weight % of $La_2O_3$, $Mn_3O_4$, and CuO of Examples 1 to 25 of trial production were plotted on the triangular figure. FIG. 3 is the whole triangular figure and FIG. 4 is an enlarged drawing of a main part of FIG. 3. The number surrounded by parentheses in a triangular figure is the number of the example of trial production. Quality evaluation of the degree of black was superimposed on the position where the three-type main component-based black mixed oxide materials of examples of trial production were plotted, as shown in FIG. 4 in detail. Then, areas surrounded by the combination ratio (% by weight) were calculated based on the quality evaluation.

The gray-colored portion in FIG. 4 corresponds to a suitable region of the black mixed oxide material (three-type main component-based) of the mixed oxide of La, Mn and Cu. Specifically, regarding La($La_2O_3$), there are few La($La_2O_3$) in Example 16 of trial production, and there are many La($La_2O_3$) in Example 23 of trial production. Regarding Mn($MnO_2$), there are few Mn($MnO_2$) in Examples 22 and 23 of trial production, and there are many Mn($MnO_2$) in Example 15 of trial production. Regarding Cu(CuO), there are few Cu(CuO) in Examples 24 and 25 of trial production, and there are many Cu(CuO) in Examples 17 to 21 of trial production. The boundary where these quality evaluations switch can be considered as the limit on combination. Accordingly, in the oxide equivalent amount in which the total weight is 100% by weight, it was concluded that the area surrounded by the range which the content of $La_2O_3$ is 35 to 70% by weight, the range which the content of $MnO_2$ is 25 to 60% by weight, and the range which the content of CuO is 0.5 to 10% by weight was optimal.

[Production (II) of Black Mixed Oxide Material]

From production (I) of the above-mentioned black mixed oxide material, the suitable combination ratio of the components in the three-type main component-based black mixed oxide materials was found out. Next, Mo was also added to the three-type main component-based black mixed oxide material to produce a four-type main component-based black mixed oxide material. Together with the production of the black mixed oxide material, quality evaluation of the degree of black was conducted. It was considered as combination of Examples 26 to 34 of trial production of Tables 6 and 7, combination of Mo was increased in this order, and the degree of black was measured. In order to facilitate grasping of the blending amount of Mo($MoO_3$), the total weight of three components was assumed to be 100% by weight, and $MoO_3$ was blended with respect to the 100% by weight. The method of manufacturing the black mixed oxide material of Examples 26 to 34 of trial production was performed on the same conditions as in the production (I) of the above-mentioned black mixed oxide material. Quality evaluation of the degree of black was also performed using the same reference as that in the production (I).

TABLE 6

| No. of example of trial product | Example 26 of trial product | Example 27 of trial product | Example 28 of trial product | Example 29 of trial product | Example 30 of trial product |
|---|---|---|---|---|---|
| $La_2O_3$ (wt %) | 57 | 57 | 57 | 57 | 56 |
| $Mn_3O_4$ (wt %) | 40 | 40 | 40 | 40 | 39 |
| CuO (wt %) | 3 | 3 | 3 | 3 | 3 |
| Total of three components (wt %) | 100 | 100 | 100 | 100 | 100 |
| $MoO_3$ (wt %) | 0.01 | 0.1 | 0.5 | 1 | 2 |
| Total of four components (wt %) | 100.01 | 100.1 | 100.5 | 101 | 102 |
| L value | 25.00 | 23.93 | 22.07 | 20.77 | 20.75 |
| a value | 0.09 | 0.09 | −0.06 | −0.04 | −0.03 |
| b value | −1.63 | −1.65 | −1.67 | −1.68 | −1.67 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 1.04 | 1.05 | 1.01 | 1.02 | 1.04 |
| Quality evaluation | A | A | A | A | A |

TABLE 7

| No. of example of trial product | Example 31 of trial product | Example 32 of trial product | Example 33 of trial product | Example 34 of trial product |
|---|---|---|---|---|
| $La_2O_3$ (wt %) | 55 | 54 | 54 | 53 |
| $Mn_3O_4$ (wt %) | 39 | 38 | 37 | 37 |
| CuO (wt %) | 3 | 3 | 3 | 3 |
| Total of three components (wt %) | 100 | 100 | 100 | 100 |
| $MoO_3$ (wt %) | 3 | 5 | 6 | 7 |
| Total of four components (wt %) | 103 | 105 | 106 | 107 |
| L value | 20.75 | 20.71 | 25.20 | 25.97 |
| a value | −0.01 | −0.01 | 0.31 | 0.39 |
| b value | −1.65 | −1.59 | −1.56 | 0.49 |
| first baking temperature (° C.) | 1000 | 1000 | 1000 | 1000 |
| second baking temperature (° C.) | 900 | 900 | 900 | 900 |
| final average particle diameter (μm) | 1.10 | 1.06 | 1.07 | 1.03 |
| Quality evaluation | A | A | F | F |

[Results and Consideration of Production (II) of Black Mixed Oxide Material]

Regarding Examples 26 to 34 of trial production, a three-type main component-based composition of the preceding stage in which Mo($MoO_3$) is blended is common as the above-mentioned Example 3 of trial production. In proportion to the blending amount of Mo($MoO_3$), the tendency of the degree of black after Example 26 of trial production (L value) increased. However, decrease in the degree of black became remarkable in Example 33 and following examples of trial production bordering on Example 32 of trial production. In view of the results, it was concluded that, in an oxide equivalent amount in which the total weight of three types of oxides that are $La_2O_3$ as an oxide of La, $MnO_2$ as an oxide of Mn, and CuO as an oxide of Cu is 100% by weight, the mixed oxide contains Mo as $MoO_3$ at a ratio of 5% by weight or less with respect to 100% by weight of the oxide equivalent amount. Note that the lower limit of the equivalent weight of Mo, 0.01% by weight or more was determined to be appropriate from a viewpoint for clarifying the effect of addition of Mo.

[Production (III) of Black Mixed Oxide Material]

Regarding accessory components of the black mixed oxide material which can be blended into the mixed oxide, and a combination ratio thereof, Examples 35 to 58 of trial production were produced, and the degree of black was measured and verified. The method of manufacturing the black mixed oxide materials of Examples 26 to 34 of trial production was performed on the same conditions as production (I) of the above-mentioned black mixed oxide material. Quality evaluation of the degree of black was also based on the same reference as that of the production (I). In order to facilitate grasping of the blending amount of an accessory component, the total weight of three components was 100% by weight, and the accessory components (equivalent amounts of the above-mentioned oxides) was blended with respect to the 100% by weight. Results are shown in Tables 8 to 12.

TABLE 8

| No. of example of trial product | Example 35 of trial product | Example 36 of trial product | Example 37 of trial product | Example 38 of trial product | Example 39 of trial product |
|---|---|---|---|---|---|
| La$_2$O$_3$ (wt %) | 57 | 57 | 57 | 57 | 57 |
| Mn$_3$O$_4$ (wt %) | 40 | 40 | 40 | 40 | 40 |
| CuO (wt %) | 3 | 3 | 3 | 3 | 3 |
| Total of three components (wt %) | 100 | 100 | 100 | 100 | 100 |
| MoO$_3$ (wt %) | 1 | 1 | 1 | 1 | 1 |
| Accessary components (wt %) | | | | | |
| FeOOH | 3 | | | | |
| MgO | | 3 | | | |
| Al$_2$O$_3$ | | | 3 | | |
| SiO$_2$ | | | | 3 | |
| CaCO$_3$ | | | | | 3 |
| V$_2$O$_5$ | | | | | |
| ZnO | | | | | |
| SrCO$_3$ | | | | | |
| Y$_2$O$_3$ | | | | | |
| ZrO$_2$ | | | | | |
| BaCO$_3$ | | | | | |
| Ta$_2$O$_5$ | | | | | |
| Bi$_2$O$_3$ | | | | | |
| CeO$_2$ | | | | | |
| Pr$_6$O$_{11}$ | | | | | |
| Nb$_2$O$_5$ | | | | | |
| Total of accessary components (wt %) | 3 | 3 | 3 | 3 | 3 |
| Total sum (wt %) | 104 | 104 | 104 | 104 | 104 |
| L value | 20.39 | 19.87 | 19.30 | 20.25 | 20.13 |
| a value | 0.06 | 0.05 | 0.06 | 0.04 | 0.03 |
| b value | 0.44 | −1.43 | −1.42 | −1.53 | −1.39 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 0.99 | 1.03 | 1.09 | 0.98 | 1.11 |
| Quality evaluation | A | A | A | A | A |

TABLE 9

| No. of example of trial product | Example 40 of trial product | Example 41 of trial product | Example 42 of trial product | Example 43 of trial product | Example 44 of trial product |
|---|---|---|---|---|---|
| La$_2$O$_3$ (wt %) | 57 | 57 | 57 | 57 | 57 |
| Mn$_3$O$_4$ (wt %) | 40 | 40 | 40 | 40 | 40 |
| CuO (wt %) | 3 | 3 | 3 | 3 | 3 |
| Total of three components (wt %) | 100 | 100 | 100 | 100 | 100 |
| MoO$_3$ (wt %) | 1 | 1 | 1 | 1 | 1 |
| Accessary components (wt %) | | | | | |
| FeOOH | | | | | |
| MgO | | | | | |
| Al$_2$O$_3$ | | | | | |
| SiO$_2$ | | | | | |
| CaCO$_3$ | | | | | |
| V$_2$O$_5$ | 3 | | | | |
| ZnO | | 3 | | | |
| SrCO$_3$ | | | 3 | | |
| Y$_2$O$_3$ | | | | 15 | |
| ZrO$_2$ | | | | | 3 |
| BaCO$_3$ | | | | | |
| Ta$_2$O$_5$ | | | | | |
| Bi$_2$O$_3$ | | | | | |

TABLE 9-continued

| No. of example of trial product | Example 40 of trial product | Example 41 of trial product | Example 42 of trial product | Example 43 of trial product | Example 44 of trial product |
| --- | --- | --- | --- | --- | --- |
| $CeO_2$ | | | | | |
| $Pr_6O_{11}$ | | | | | |
| $Nb_2O_5$ | | | | | |
| Total of accessary components (wt %) | 3 | 3 | 3 | 15 | 3 |
| Total sum (wt %) | 104 | 104 | 104 | 116 | 104 |
| L value | 20.53 | 20.02 | 18.92 | 20.49 | 18.70 |
| a value | 0.06 | 0.01 | 0.23 | −0.38 | 0.01 |
| b value | −1.15 | −1.38 | −1.21 | −1.70 | −1.09 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 1.03 | 1.01 | 1.00 | 0.98 | 1.09 |
| Quality evaluation | A | A | A | A | A |

TABLE 10

| No. of example of trial product | Example 45 of trial product | Example 46 of trial product | Example 47 of trial product | Example 48 of trial product | Example 49 of trial product |
| --- | --- | --- | --- | --- | --- |
| $La_2O_3$ (wt %) | 57 | 57 | 57 | 57 | 57 |
| $Mn_3O_4$ (wt %) | 40 | 40 | 40 | 40 | 40 |
| CuO (wt %) | 3 | 3 | 3 | 3 | 3 |
| Total of three components (wt %) | 100 | 100 | 100 | 100 | 100 |
| $MoO_3$ (wt %) | 1 | 1 | 1 | 1 | 1 |
| Accessary components (wt %) | | | | | |
| FeOOH | | | | | |
| MgO | | | | | |
| $Al_2O_3$ | | | | | |
| $SiO_2$ | | | | | |
| $CaCO_3$ | | | | | |
| $V_2O_5$ | | | | | |
| ZnO | | | | | |
| $SrCO_3$ | | | | | |
| $Y_2O_3$ | | | | | |
| $ZrO_2$ | | | | | |
| $BaCO_3$ | 3 | | | | |
| $Ta_2O_5$ | | 3 | | | |
| $Bi_2O_3$ | | | 3 | | |
| $CeO_2$ | | | | 3 | |
| $Pr_6O_{11}$ | | | | | 20 |
| $Nb_2O_5$ | | | | | |
| Total of accessary components (wt %) | 3 | 3 | 3 | 3 | 20 |
| Total sum (wt %) | 104 | 104 | 104 | 104 | 121 |
| L value | 18.99 | 19.01 | 19.00 | 18.88 | 20.33 |
| a value | 0.00 | 0.03 | −0.02 | −0.01 | −0.32 |
| b value | −0.99 | −0.93 | −1.11 | −1.32 | −1.82 |
| first baking temperature (° C.) | 1000 | 1000 | 1000 | 1000 | 1000 |
| second baking temperature (° C.) | 900 | 900 | 900 | 900 | 900 |
| final average particle diameter(μm) | 1.07 | 1.07 | 1.05 | 1.03 | 1.11 |
| Quality evaluation | A | A | A | A | A |

TABLE 11

| No. of example of trial product | Example 50 of trial product | Example 51 of trial product | Example 52 of trial product | Example 53 of trial product | Example 54 of trial product |
|---|---|---|---|---|---|
| $La_2O_3$ (wt %) | 57 | 57 | 57 | 57 | 57 |
| $Mn_3O_4$ (wt %) | 40 | 40 | 40 | 40 | 40 |
| CuO (wt %) | 3 | 3 | 3 | 3 | 3 |
| Total of three components (wt %) | 100 | 100 | 100 | 100 | 100 |
| $MoO_3$ (wt %) | 1 | 1 | 1 | 1 | 1 |
| Accessary components (wt %) | | | | | |
| FeOOH | | 3 | | 3 | 2 |
| MgO | | | | | |
| $Al_2O_3$ | | | | | |
| $SiO_2$ | | 1 | | 3 | 3 |
| $CaCO_3$ | | | | | |
| $V_2O_5$ | | | | | |
| ZnO | | | | | |
| $SrCO_3$ | | | | | |
| $Y_2O_3$ | | | | | 3 |
| $ZrO_2$ | | | | | |
| $BaCO_3$ | | | | | |
| $Ta_2O_5$ | | | | | |
| $Bi_2O_3$ | | | | | |
| $CeO_2$ | | | | | |
| $Pr_6O_{11}$ | | | 3 | | 5 |
| $Nb_2O_5$ | 3 | | | | |
| Total of accessary components (wt %) | 3 | 4 | 3 | 6 | 13 |
| Total sum (wt %) | 104 | 105 | 104 | 107 | 114 |
| L value | 20.14 | 20.18 | 20.38 | 20.36 | 20.29 |
| a value | −0.21 | 0.01 | −0.08 | −0.13 | −0.01 |
| b value | −1.65 | −1.62 | −0.02 | −0.05 | −1.11 |
| first baking temperature (° C.) | 1000 | 1000 | 1000 | 1000 | 1000 |
| second baking temperature (° C.) | 900 | 900 | 900 | 900 | 900 |
| final average particle diameter (μm) | 1.03 | 1.03 | 1.05 | 1.07 | 1.11 |
| Quality evaluation | A | A | A | A | A |

TABLE 12

| No. of example of trial product | Example 55 of trial product | Example 56 of trial product | Example 57 of trial product | Example 58 of trial product |
|---|---|---|---|---|
| $La_2O_3$ (wt %) | 57 | 57 | 57 | 57 |
| $Mn_3O_4$ (wt %) | 40 | 40 | 40 | 40 |
| CuO (wt %) | 3 | 3 | 3 | 3 |
| Total of three components (wt %) | 100 | 100 | 100 | 100 |
| $MoO_3$ (wt %) | 0 | 1 | 1 | 1 |
| Accessory components (wt %) | | | | |
| FeOOH | | 5 | | |
| MgO | | | | |
| $Al_2O_3$ | | | | |
| $SiO_2$ | | | | |
| $CaCO_3$ | | | | |
| $V_2O_5$ | | | | |
| ZnO | | | | |
| $SrCO_3$ | | | | |
| $Y_2O_3$ | 5 | 3 | 10 | 5 |
| $ZrO_2$ | | | | |
| $BaCO_3$ | | | | |
| $Ta_2O_5$ | | | | |
| $Bi_2O_3$ | | | | |
| $CeO_2$ | | | | |

TABLE 12-continued

| No. of example of trial product | Example 55 of trial product | Example 56 of trial product | Example 57 of trial product | Example 58 of trial product |
|---|---|---|---|---|
| $Pr_6O_{11}$ | | 5 | | 15 |
| $Nb_2O_5$ | 10 | | | |
| Total of accessory components (wt %) | 15 | 13 | 10 | 20 |
| Total sum (wt %) | 115 | 114 | 111 | 121 |
| L value | 20.18 | 20.22 | 20.31 | 20.30 |
| a value | −0.09 | −0.15 | −0.12 | −0.22 |
| b value | −0.09 | −0.19 | −0.89 | −0.10 |
| first baking temperature(° C.) | 1000 | 1000 | 1000 | 1000 |
| second baking temperature (° C.) | 900 | 900 | 900 | 900 |
| final average particle diameter (μm) | 1.13 | 1.17 | 1.03 | 1.01 |
| Quality evaluation | A | A | A | A |

[Results and Consideration of Production (III) of Black Mixed Oxide Material]

Any types of accessory components were considered as being capable of being blended from the results of Examples 35 to 50 of trial production shown in Tables. Although the variation arose for every type of accessory component, it was observed that any types of accessory components in general contribute to decrease in the degree of black (L value). Even if examples in which amount of the accessory components increased to 20% by weight of Examples 49 and 58 of trial production, enough degree of black was obtained. Of course, it is possible to increase the amount (oxide equivalent amount) of the accessory components to 20% by weight or more. However, it is anxious that superfluous increase in the amount of accessory components affects with a fall in purity of a mixed oxide, the crystal structure of a mixed oxide, and presence of black color, and stability when using the black mixed oxide material as a black pigment becomes also unignorable. For this reason, as a temporary standard based on the results of the examples of trial production, in an oxide equivalent amount in which the total weight of three types of oxides that are $La_2O_3$ as an oxide of La, $MnO_2$ as an oxide of Mn, and CuO as an oxide of Cu is 100% by weight, the amounts (oxide equivalent amounts) of the accessory components were specified as 20% by weight or less with respect to 100% by weight of the oxide equivalent amounts.

[Production (IV) of Black Mixed Oxide Material]

In place of the method of manufacturing according to the second embodiment described above, the black mixed oxide materials of Examples 59 to 63 of trial production were produced according to a simpler manufacturing method disclosed in the first embodiment shown in FIG. 1, and evaluation of the degree of black was conducted. The relative weight ratio (% by weight) of each component is shown in Table 13.

The materials prepared for blending for every example of trial production were thrown into a ball mill, and mixed and ground. The blending ratio in mixing and grinding was as follows: 100 parts by weight of the total weight of each starting oxide material, 300 parts by weight of steel balls (2 to 5 mm in diameter), 150 parts by weight of water and a water reducing agent (ammonium polyacrylate, manufactured by Toagosei, Inc.: "A-6114") were 0.5 to 2 parts by weight to the total weight of each starting oxide material. Mixing and grinding were performed in the ball mill for 15 to 20 hours to obtain a mixed ground product. The mixed ground product was dried with a spray drier at a hot wind temperature of 280° C., and thereafter, the mixed ground product was baked by a tunnel kiln at about 1000° C. for 2 to 3 hours. After baking, the mixed ground product was subject to dry grinding to allow the mixed ground product to have a mean particle diameter of 8 to 20 μm using a pulverizer, the particles of 2 μm or less were sorted. The black mixed oxide material of each example of trial production was obtained from a series of operations.

TABLE 13

| No. of example of trial product | Example 59 of trial product | Example 60 of trial product | Example 61 of trial product | Example 62 of trial product | Example 63 of trial product |
|---|---|---|---|---|---|
| $La_2O_3$ (wt %) | 55 | 56 | 57 | 59 | 40 |
| $Mn_3O_4$ (wt %) | 42 | 41 | 40 | 38 | 50 |
| CuO (wt %) | 3 | 3 | 3 | 3 | 10 |
| Total (wt %) | 100 | 100 | 100 | 100 | 100 |
| L value | 19.02 | 19.51 | 20.03 | 19.15 | 18.70 |
| a value | 0.08 | 0.16 | 0.18 | 0.17 | 0.29 |
| b value | −1.53 | −0.83 | −1.19 | −1.23 | 0.36 |
| baking temperature (° C.) | 1000 | 1000 | 1000 | 1000 | 1000 |
| final average particle diameter (μm) | 1.01 | 0.97 | 1.05 | 1.10 | 1.03 |
| Quality evaluation | A | A | A | A | A |

[Results and Consideration of Production (IV) of Black Mixed Oxide Material]

Also, in each example of trial production in accordance with the manufacturing method of the first embodiment, enough degree of black (L value) was observed. Examples 59, 60, 61, 62 and 63 of trial production have the same three-type main component-based compositions as those in the above-mentioned Examples 1, 2, 3, 4 and 7 of trial production, and only a manufacturing method was changed. From a mutual comparison, with the increase of the number of baking, L value fell and the increase in the degree of black was found. Therefore, one of manufacturing methods can be selected in view of balance of quality and a manufacturing cost, for example, according to the use required when using a black mixed oxide material as a black pigment.

[Structural Analysis of Black Mixed Oxide Material]

X-ray diffraction (XRD) measurement was conducted regarding the black mixed oxide materials of examples of trial production. The product manufactured by Malvern Panalytical Ltd. and the X-ray diffraction device "X' Pert$^3$ Powder", X-ray source: CuKα-ray were used. FIG. 5 shows an X-ray diffraction pattern of the black mixed oxide material of Example 29 of trial production (four-type main components-based), FIG. 6 shows an X-ray diffraction pattern of the black mixed oxide material of Example 35 of trial production (Mo and accessory component combination), and FIG. 7 shows an X-ray diffraction pattern of the black mixed oxide material of Example 51 of trial production (Mo and accessory component combination). The maximum intensity diffraction peak exists in a range of 31° to 34° of a diffraction angle 2θ in the diffraction pattern of any drawings. Further, it is inferred that the phase which has a perovskite structure of a rhombohedral system (space group R3-c) is included as a main phase. In addition, it is assumed that $Mn_3O_4$ which has a spinel structure as an oxide of Mn is also contained in the mixed oxide, determined from the position of the black pigmented square in the illustrated pattern.

The Miller index (mirror plane indices) corresponding to the hexagonal unit lattice which makes a grating constant a=b<c can be given to the phase of the perovskite in the black mixed oxide material of examples of trial production. Specifically, they are a (012) plane, a (110) plane, a (104) plane, a (113) plane, a (202) plane, a (006) plane, a (024) plane, a (122) plane, a (116) plane, a (030) plane, a (214) plane, a (018) plane, or the like (see illustrated parts in FIGS.). Note that regarding Example 29 of trial production of FIG. 5 grating constants were as follows: a=0.552 nm; and c=1.33 nm.

[Examination of Baking Temperature]

Examples were produced taking an optimal baking temperature at the time of production of black mixed oxide material, changing temperature. Examples 64 to 71 of trial production shown in Tables 14 and 15 are the black pigments produced based on the above-mentioned relative weight ratio (% by weight) of each component according to the producing method (see FIG. 1 of the first embodiment) of production (IV) of the above-mentioned black mixed oxide material. L value or the like was measured after production.

TABLE 14

| No. of example of trial product | Example 64 of trial product | Example 65 of trial product | Example 66 of trial product | Example 67 of trial product |
|---|---|---|---|---|
| $La_2O_3$ (wt %) | 57 | 57 | 57 | 57 |
| $Mn_3O_4$ (wt %) | 40 | 40 | 40 | 40 |
| CuO (wt %) | 3 | 3 | 3 | 3 |
| Total of three components (wt %) | 100 | 100 | 100 | 100 |
| $MoO_3$ (wt %) Accessory components (wt %) | 1 | 1 | 1 | 1 |
| FeOOH | 3 | 3 | 3 | 3 |
| $SiO_2$ | 1 | 1 | 1 | 1 |
| Total of accessory components (wt %) | 4 | 4 | 4 | 4 |
| Total sum (wt %) | 105 | 105 | 105 | 105 |
| L value | 38.22 | 24.89 | 23.11 | 22.67 |
| a value | 9.79 | 5.34 | 3.38 | 2.41 |
| b value | 9.89 | 4.41 | 3.38 | 2.15 |
| baking temperature (° C.) | 650 | 700 | 800 | 900 |
| final average particle diameter(μm) | 0.99 | 1.02 | 1.06 | 1.09 |
| Quality evaluation | F | A | A | A |

TABLE 15

| No. of example of trial product | Example 68 of trial product | Example 69 of trial product | Example 70 of trial product | Example 71 of trial product |
|---|---|---|---|---|
| $La_2O_3$ (wt %) | 57 | 57 | 57 | 57 |
| $Mn_3O_4$ (wt %) | 40 | 40 | 40 | 40 |
| CuO (wt %) | 3 | 3 | 3 | 3 |
| Total of three components (wt %) | 100 | 100 | 100 | 100 |
| $MoO_3$ (wt %) | 1 | 1 | 1 | 1 |
| Accessary components (wt %) | | | | |
| FeOOH | 3 | 3 | 3 | 3 |
| $SiO_2$ | 1 | 1 | 1 | 1 |
| Total of accessary components (wt %) | 4 | 4 | 4 | 4 |
| Total sum (wt %) | 105 | 105 | 105 | 105 |
| L value | 22.06 | 22.47 | 23.96 | 25.36 |
| a value | 2.18 | 0.42 | 0.45 | 0.45 |
| b value | −1.03 | 2.41 | 2.73 | 2.99 |
| baking temperature (° C.) | 1000 | 1100 | 1200 | 1250 |
| final average particle diameter (μm) | 1.06 | 1.06 | 1.02 | 1.05 |
| Quality evaluation | A | A | A | F |

The results shown in Tables 14 and 15 revealed that at a baking temperature 650° C. in Example 64 of trial production, L value was remarkably poor. It seems that sintering was insufficient and a crystal structure was not generated. In contrast, at a baking temperature 700° C. in Example 65 of trial production, L value improved greatly. Between a baking temperature 1200° C. in Example 70 of trial production and a baking temperature of 1250° C. in Example 71 of trial production, L value increased. Therefore, in view of the condition for obtaining black (L value is 25 or less) favorable as a pigment use, a baking temperature can be drawn as a range of 700° C. to 1200° C.

Furthermore, according to production (see the second embodiment shown in FIG. 2) of production (III) of the black mixed oxide materials containing an accessory component, the black mixed oxide materials of Examples 72 to 79 of trial production shown in Tables 14 and 15 were produced. L value or the like was measured after production.

TABLE 16

| No. of example of trial product | Example 72 of trial product | Example 73 of trial product | Example 74 of trial product | Example 75 of trial product |
|---|---|---|---|---|
| $La_2O_3$ (wt %) | 57 | 57 | 57 | 57 |
| $Mn_3O_4$ (wt %) | 40 | 40 | 40 | 40 |
| CuO (wt %) | 3 | 3 | 3 | 3 |
| Total of three components (wt %) | 100 | 100 | 100 | 100 |
| $MoO_3$ (wt %) | 1 | 1 | 1 | 1 |
| Accessary components (wt %) | | | | |
| FeOOH | 3 | 3 | 3 | 3 |
| $SiO_2$ | 1 | 1 | 1 | 1 |
| Total of accessary components (wt %) | 4 | 4 | 4 | 4 |
| Total sum (wt %) | 105 | 105 | 105 | 105 |
| L value | 33.29 | 31.36 | 30.11 | 28.29 |
| a value | 9.62 | 0.36 | 5.27 | 3.20 |
| b value | 9.78 | 9.71 | 5.04 | 3.20 |
| first baking temperature (° C.) | 650 | 650 | 650 | 650 |
| second baking temperature (° C.) | 550 | 600 | 700 | 800 |
| final average particle diameter (mm) | 0.98 | 0.99 | 0.97 | 1.01 |
| Quality evaluation | F | F | F | F |

TABLE 17

| No. of example of trial product | Example 76 of trial product | Example 77 of trial product | Example 78 of trial product | Example 79 of trial product |
|---|---|---|---|---|
| La$_2$O$_3$ (wt %) | 57 | 57 | 57 | 57 |
| Mn$_3$O$_4$ (wt %) | 40 | 40 | 40 | 40 |
| CuO (wt %) | 3 | 3 | 3 | 3 |
| Total of three components (wt %) | 100 | 100 | 100 | 100 |
| MoO$_3$ (wt %) Accessary components (wt %) | 1 | 1 | 1 | 1 |
| FeOOH | 3 | 3 | 3 | 3 |
| SiO$_2$ | 1 | 1 | 1 | 1 |
| Total of accessary components (wt %) | 4 | 4 | 4 | 4 |
| Total sum (wt %) | 105 | 105 | 105 | 105 |
| L value | 22.33 | 22.28 | 23.31 | 25.09 |
| a value | 0.06 | 0.03 | 0.08 | 0.02 |
| b value | 1.07 | 0.03 | 0.01 | −0.09 |
| first baking temperature (° C.) | 1100 | 1100 | 1100 | 1100 |
| second baking temperature (° C.) | 700 | 800 | 1000 | 1150 |
| final average particle diameter (mm) | 1.01 | 0.99 | 1.03 | 1.09 |
| Quality evaluation | A | A | A | F |

In examples in which the first baking temperature is less than 700° C., L value was remarkably poor, as shown in Examples 72 to 75 of trial production. This tendency seems to be the same as that of Example 64 of trial production. Then, from Example 79 of trial production, even if the first and second baking temperatures were below 1200° C., when the second baking temperature was set to a higher temperature than the first baking temperature, an increase in L value was observed. Therefore, in the manufacturing method in which baking of the second embodiment was carried out twice, the first baking temperature is set to a range of 700° C. to 1200° C., and the accompanying second baking temperature is desirably in a range of 600° C. to 1100° C.

[Application of Black Mixed Oxide Material]

<1. Inorganic Glass Paste>

A glass color composition powder containing a combination of 25 parts by weight of black mixed starting oxide material (black pigment) of Example 29 of trial production, and 75 parts by weight of glass powder was prepared. To 100 parts by weight of the glass color constituent powder, 30 parts by weight of addition oil was added, and the mixed powder was kneaded by a kneader with three rolls, and finished in the shape of a paste. Addition oil has a combination ratio of 93 parts by weight of pineapple oil, 4 parts by weight of ethyl cellulose (manufactured by the Dow Chemical Co.), and 3 parts by weight of isobutyl methacrylate resin (manufactured by Leucite Japan, Inc.: "Elvacite #2045"). The composition (exhibition of blending amount) of the above-mentioned glass powder was as follows, and the average particle diameter of the glass powder was 3.3 μm.

TABLE 18

| [Glass powder (relative ratio)] | |
|---|---|
| composition | wt % |
| SiO$_2$ | 45 |
| ZnO | 28 |
| B$_2$O$_3$ | 8 |

TABLE 18-continued

| [Glass powder (relative ratio)] | |
|---|---|
| composition | wt % |
| Na$_2$O | 4 |
| Li$_2$O | 4 |
| F | 2 |
| TiO$_2$ | 6 |
| ZrO$_2$ | 3 |
| Total | 100 |

The screen of the polyester fiber textiles of 180 meshes was used for the glass plate (37 mm×50 mm), and the above-mentioned black inorganic glass paste prepared was printed. After drying, the black inorganic glass paste was put into the electric furnace set as 680° C., and baked for 4 minutes. In such a manner the inorganic glass paste (black inorganic glass paste) was baked on the surface of the base material of a glass plate, and was printed to obtain a baked product.

<2. Resin Paste>

Ninety-nine parts by weight of the polypropylene was subject to heating fusion at 160° C., and four parts by weight of black mixed starting oxide material (black pigment) of Example 36 of trial production were thrown into the mixed product, the whole product was kneaded until the mixed product became uniform to prepare a resin paste (black resin paste). The resin paste was coated on the surface of the base material of a glass plate. Bar coater was used when coating. Accordingly, the base material of a glass plate was left to stand under a room temperature, the resin was cured to obtain a black resin and a coated product thereof.

<3. Inorganic Ceramic Material>

As a ceramic agent, five parts by weight of black mixed starting oxide material (black pigment) of Example 51 of trial production were added to ninety-five parts by weight of yttria partially stabilized zirconia to prepare one hundred parts by weight of inorganic mixture. One hundred parts by weight of the inorganic mixture, three hundred parts by weight of zirconia balls (3 to 10 mm in diameter), and one hundred and fifty parts by weight of water were thrown into a ball mill, mixed and ground for 20 hours to obtain a mixed ground product. An acrylic resin-based organic binder was added to the mixed ground product, and the mixed ground product was dried with spray dry, and the mixed ground product after drying was press-formed to obtain a formed product, the formed product was carried in an electric furnace, and the entire product was sintered by baking at 1500° C. for 2 hours. After gradual cooling, the formed product was taken out from the electric furnace, and appropriately ground, polished to obtain an inorganic ceramic material (black inorganic ceramic material) of the sintered product.

The various products which all present an excellent black color were able to be obtained for three types of products in which the black mixed oxide material was used as a black pigment as shown in results of application of the black mixed oxide material. Since the particle diameter is fine especially, an application range is broad. Therefore, the same use as the existing black pigments is possible. For example, an inorganic glass paste (black inorganic glass paste) is for a coating use of windowpanes, such as vehicles, or the like. A resin paste (black resin paste) can be applied to the resinated article at large colored in the existing black. Various types of casts manufactured extensively now are assumed. Since the black mixed oxide material can be also applied to inorganic ceramic materials (black inorganic ceramic materials), manufacturing the ceramic processed products which present black color other than glass is also expectable.

[Nonmagnetic Measurement and Results]

Inventors tried to measure magnetism in order to further investigate the characteristics of the black mixed oxide material. Using the above-mentioned black mixed oxide material "Example 51 of trial production", saturation magnetization [Ms] (emu/g), residual magnetization [Mr] (emu/g) and holding power [Hc] (Oe) were measured, and weight magnetic susceptibility (emu/(g-Oe)) was calculated.

Figure 8:
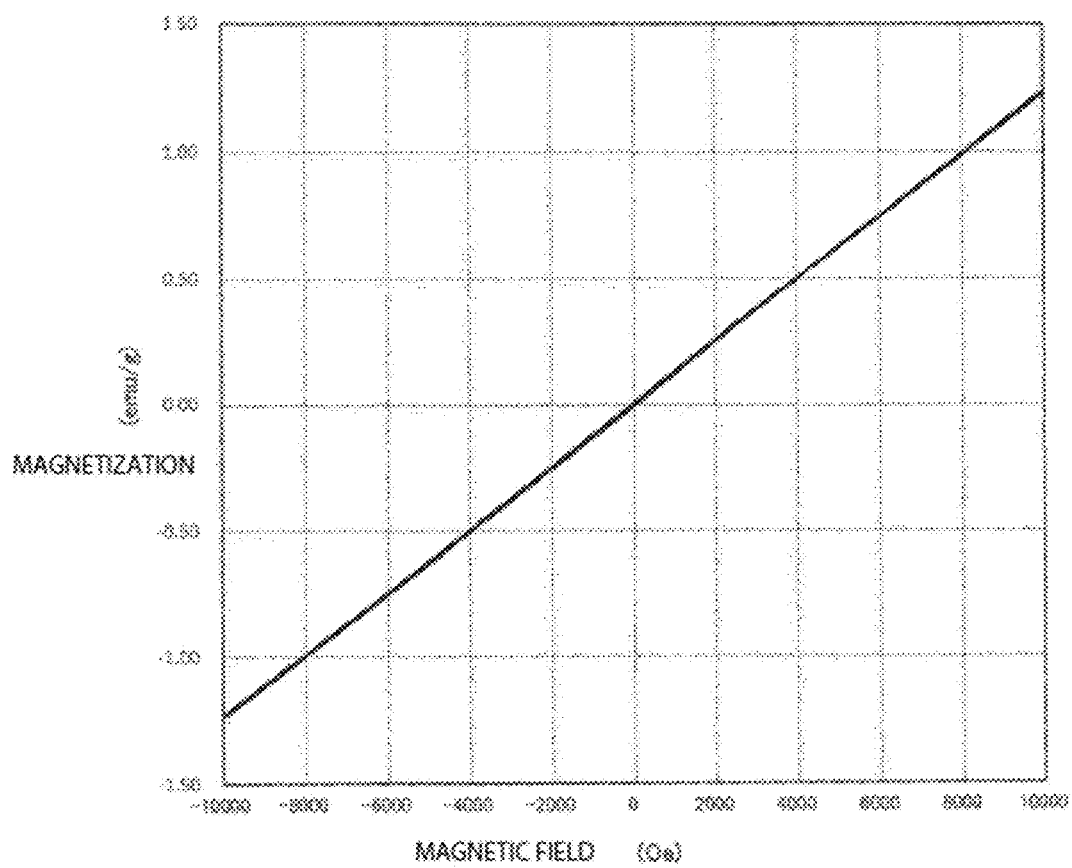
FIG. 8 is a graph of the magnetization curve of Example 51 of trial production.
Figure 9:
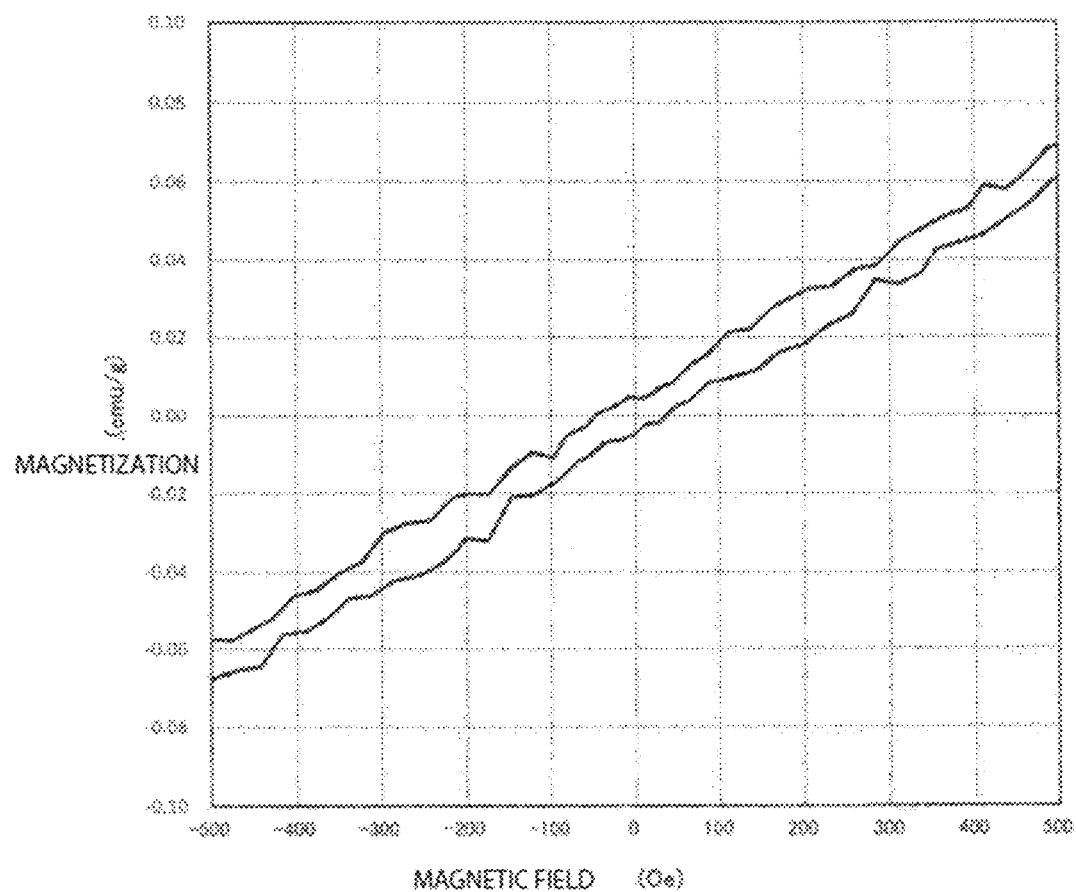
FIG. 9 is a graph obtained by partially expanding the graph of FIG. 8.

The vibrating sample magnetometer (manufactured by Toei Industry, Inc. VSM-5 type) was used for the measuring device, measurement temperature was a room temperature and the magnetic field range was 10 kOe and the sample weight was 163.66 mg. The impression magnetic field was a value in 10 kOe when measuring saturation magnetization. The results of the measured values are shown in Table 19. Together with the results, a graph of a magnetization curve in which the X-axis is set as magnetic field (Oe), and the Y-axis is set as magnetization (emu/g) is also shown in FIG. 8 and FIG. 9. The graph of FIG. 9 is obtained by enlarging the graph in FIG. 8.

TABLE 19

| [Magnetic property] | | |
| --- | --- | --- |
| item | unit | result |
| Saturation magnetization Ms | emu/g | 1.24 |
| Residual magnetization Mr | emu/g | $3.9 \times 10^{-3}$ |
| Holding power Hc | Oe | $3.6 \times 10^{1}$ |
| Weight susceptibility | emu/(g · Oe) | $1.24 \times 10^{-4}$ |

It was observed that the black mixed oxide material could not be easily tinged with magnetism from Table 19, and FIG. 8 and FIG. 9. Therefore, it seems that the black mixed oxide material is suitable for the use of magnetic shielding. For example, a black mixed oxide material is used for covering electronic parts, for example. It seems that influence by an external magnetic field on the electronic substrate, a processor, or the like is reduced, and that the black mixed oxide material is advantageous for controlling malfunction, for example.

[Insulating Measurement and Results]

Then, the inventors tried to measure insulation as a characteristic of the black mixed oxide material. A ring made of aluminum with an inside diameter of 31 mm, an outside diameter of 38 mm, and a thickness of 5 mm was prepared. Inside the ring inner diameter, 7 g of the above-mentioned black mixed oxide material "Example 51 of trial production" was enclosed. The ring was pressed from the upper and lower sides, and a sample was pelletized to obtain a test piece. Next, a silicone rubber plate having the same thickness as that of the above-mentioned ring was prepared for the purpose of insulating. The silicone rubber plate is provided with a hole with the same outside diameter (38 mm) as that of the above-mentioned ring, and covered the periphery of the ring made of aluminum. Further, two stainless-steel plates were prepared and the ring, the test piece, and the silicone rubber substrate were put among both steel plates. An anode was connected to the lower stainless-steel plate, and a cathode was connected to the upper stainless-steel plate, and the steel plates were energized.

That is, insulating property was evaluated by measuring an impressed voltage when a dielectric breakdown arose. The dielectric breakdown was "8.8 kV" as a result of energization. If the dielectric breakdown is converted into a voltage per mm, the voltage is "1.76 kV/mm". The insulation of mixed oxide material was able to be observed from the numerical value. Therefore, a black mixed oxide material is used for covering electronic parts, and as a housing or the like in view of insulation performance, for example. In consideration of the insulating characteristic of the black mixed oxide material as well as the above-mentioned characteristic in which the black mixed oxide material is hard to be magnetized, the black mixed oxide material is advantageous for reducing the influence on an electronic substrate and a processor, for example, and controlling the malfunction, for example.

In addition to the use as a black pigment, the black mixed oxide material has also a performance as a nonmagnetic material from magnetic shielding and insulating performance, and an insulating material from the circumstances based on a series of measurement. In addition, since the black mixed oxide material can be easily mixed into a ceramic agent, a glass agent, and a resin agent, the black mixed oxide material is also flexibly applicable to various product development.

INDUSTRIAL AVAILABILITY

The black mixed oxide material of the present invention is a composition which fails to contain chromium per se of any valency in main components, and also fails to contain cobalt in the main components, and thus the black mixed oxide material has high safety, and also an excellent color tone and economic efficiency, and also nonmagnetic and insulation. Therefore, the black mixed oxide material not only substitutes for existing black pigments but also is suitable for use for magnetic shielding and insulating. Furthermore, extensive product deployment is possible regardless of an inorganic-based product and an organic-based product.

REFERENCE SIGNS LIST

M Starting oxide material
P1 and P2 Mixed oxide (black mixed oxide material)
11 Primary ground product
12 Baked starting material
21 First ground product
22 First baked product
23 Second ground product
24 Second baked product

The invention claimed is:

1. A black pigment containing an oxide containing La, Mn and Cu as main components, and not containing Cr and Co as the main components, wherein
Mn is made from $Mn_3O_4$, the contents of La, Mn, and Cu in the black pigment satisfy the following ratio: 35 to 70% by weight as $La_2O_3$; and 25 to 60% by weight as $MnO_2$; and 0.5 to 10% by weight as CuO, respectively, as oxide equivalent amounts in which the total weight is 100% by weight,
the black pigment has an average particle size of 20 μm or less,
the black pigment in a L*a*b* color system pursuant to JIS-Z-8729 presents a black color with the degree of black (L value) of 25.0 or less,
the black pigment has a perovskite phase exhibiting a maximum intensity diffraction peak in a range of 31° to 34° of a diffraction angle 2θ in X-ray diffraction measurement using CuKα ray as an X-ray source, and
the black pigment contains $Mn_3O_4$ that has a spinel structure, as an oxide of Mn.

2. The black pigment according to claim 1, wherein
the black pigment further contains an oxide of Mo as the main component, and
in an oxide equivalent amount in which the total weight of three kinds of oxides that are $La_2O_3$ as an oxide of La, $MnO_2$ as an oxide of Mn, and CuO as an oxide of Cu is 100% by weight, the black pigment contains Mo as $MoO_3$ at a ratio of 5% by weight or less with respect to 100% by weight of the oxide equivalent amount.

3. The black pigment according to claim 1, wherein
the black pigment contains any one or more of Li, B, Na, Mg, Al, Si, P, K, Ca, Ti, V, Fe, Zn, Sr, Y, Zr, Nb, Sn, Sb, Ba, Ta, W, Bi, Ce, Pr, Nd or Er as accessory components besides the main components, and
the black pigment contains $Li_2O$, $B_2O_3$, $Na_2O$, MgO, $Al_2O_3$, $SiO_2$, $P_2O_5$, $K_2O$, CaO, $TiO_2$, $V_2O_5$, $Fe_3O_3$, ZnO, SrO, $Y_2O_3$, $ZrO_2$, $Nb_2O_3$, $SnO_2$, $Sb_2O_3$, BaO, $Ta_2O_5$, $WO_3$, $Bi_2O_3$, $CeO_2$, $Pr_6O_{11}$, $Nd_2O_5$ or $Er_2O_3$ as the accessory components at a ratio of 20% by weight or less as oxide equivalent amounts in which the total weight of three types of oxides that are $La_2O_3$ as an oxide of La, $MnO_2$ as an oxide of Mn, and CuO as an oxide of Cu is 100% by weight.

4. The black pigment according to claim 1, wherein the black pigment is a nonmagnetic material.

5. The black pigment according to claim 1, wherein the black pigment is an insulating material.

6. A method of manufacturing the black pigment for obtaining a black pigment according to claim 1, the method comprising:
a primary grinding step of mixed grinding oxide materials of La, Mn and Cu to obtain a primary ground product with an average particle diameter of 5 μm or less, Mn being made from $Mn_3O_4$;
a material baking step of baking the primary ground product at 700 to 1200° C. to obtain a baked starting material; and
a secondary grinding step of grinding the baked starting material to an average particle diameter of 20 μm or less.

7. The method of manufacturing the black pigment according to claim 6, wherein
the black pigment further contains an oxide of Mo as the main component, and
as an oxide equivalent amount in which the total weight of three kinds of oxides that are $La_2O_3$ as an oxide of La, $MnO_2$ as an oxide of Mn, and CuO as an oxide of Cu is 100% by weight, the black pigment contains Mo as $MoO_3$ at a ratio of 5% by weight or less with respect to 100% by weight of the oxide equivalent amount.

8. A method of manufacturing the black pigment for obtaining the black pigment according to claim 1, the method comprising:
a first grinding step of mixing and grinding oxide materials of La, Mn and Cu to obtain a first ground product with an average particle diameter of 5 μm or less, Mn being made from $Mn_3O_4$;
a first baking step of baking the first ground product at 700 to 1200° C. to obtain the first baked product;
a second grinding step of grinding the first baked product to obtain a second ground product with an average particle diameter of 50 μm or less;
a second baking step of baking the second ground product at 600 to 1100° C. to obtain a second baked product; and
a third grinding step of grinding the second baked product in an average particle diameter of 20 μm or less.

9. The method of manufacturing the black pigment according to claim 8, wherein
the black pigment further contains an oxide of Mo as the main component, and
in an oxide equivalent amount in which the total weight of three kinds of oxides that are $La_2O_3$ as an oxide of La, $MnO_2$ as an oxide of Mn, and CuO as an oxide of Cu is 100% by weight, the black pigment contains Mo as $MoO_3$ at a ratio of 5% by weight or less with respect to 100% by weight of the oxide equivalent amount.

10. An inorganic ceramic material containing a black pigment according to claim 1 and a ceramic agent.

11. An inorganic glass paste containing the black pigment according to claim 1 and a glass agent.

12. A baking product which is obtained by baking the inorganic glass paste according to claim 11 on a glass member, a metallic member, a china, or porcelain.

13. A resin paste containing the black pigment according to claim 1 and a resin agent.

14. A coated product which is obtained by coating the resin paste according to claim 13 to a base material.

15. The coated product according to claim 14, wherein the base material is a glass, a metal, a china, porcelain, a resin product, or a carbon material.

16. A resin member which contains the black pigment according to claim 1 and a resin agent.

17. The black pigment according to claim 1, wherein the black pigment contains Si or Fe, or Si and Fe as accessory components in addition to the main components.

18. The method of manufacturing a black pigment according to claim 6, wherein the primary grinding step is performed by wet grinding.

19. The method of manufacturing a black pigment according to claim 6, wherein the primary grinding step is performed by wet grinding using water as a solvent.

20. The method of manufacturing a black pigment according to claim 8, wherein the primary grinding step is performed by wet grinding.

21. The method of manufacturing a black pigment according to claim 8, wherein the primary grinding step is performed by wet grinding using water as a solvent.

* * * * *